(12) United States Patent
Ozaki

(10) Patent No.: US 7,778,251 B2
(45) Date of Patent: Aug. 17, 2010

(54) BANDWIDTH CONTROL APPARATUS, BANDWIDTH CONTROL METHOD, BANDWIDTH CONTROL SYSTEM, AND BANDWIDTH ALLOCATING APPARATUS

(75) Inventor: Hirokazu Ozaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1043 days.

(21) Appl. No.: 11/446,288

(22) Filed: Jun. 5, 2006

(65) Prior Publication Data
US 2006/0280123 A1  Dec. 14, 2006

(30) Foreign Application Priority Data
Jun. 10, 2005  (JP) .............................. 2005-171083

(51) Int. Cl.
*H04L 12/56* (2006.01)
(52) U.S. Cl. ................................... 370/395.2; 370/468
(58) Field of Classification Search ................. 370/235, 370/468, 537
See application file for complete search history.

(56) References Cited

U.S. PATENT DOCUMENTS

| | | | | |
|---|---|---|---|---|
| 6,246,680 B1 * | 6/2001 | Muller et al. | ................ | 370/389 |
| 7,065,203 B1 * | 6/2006 | Huart et al. | ............ | 379/266.06 |
| 7,136,353 B2 * | 11/2006 | Ha et al. | ...................... | 370/230 |
| 7,236,483 B2 * | 6/2007 | Yeom | ........................ | 370/352 |
| 7,266,122 B1 * | 9/2007 | Hogg et al. | ............ | 370/395.41 |
| 2002/0181401 A1 * | 12/2002 | Hagirahim et al. | .......... | 370/236 |
| 2004/0052248 A1 * | 3/2004 | Frank et al. | ................. | 370/352 |
| 2005/0174938 A1 * | 8/2005 | Richardson et al. | ...... | 370/230.1 |

FOREIGN PATENT DOCUMENTS

| | | |
|---|---|---|
| EP | 1 341 350 A1 | 9/2003 |
| JP | 2004-519974 A | 7/2004 |
| WO | WO 02/089459 A1 | 11/2002 |
| WO | WO 03/009541 A | 1/2003 |

\* cited by examiner

*Primary Examiner*—Chirag G Shah
*Assistant Examiner*—Daniel Mitchell
(74) *Attorney, Agent, or Firm*—Sughrue Mion, PLLC

(57) ABSTRACT

A bandwidth control apparatus which can reflect current operation states or effective rates of the access lines on bandwidth distribution is realized for effective utilization of bandwidths in a subscriber data transmission system. In a plurality of bandwidth control apparatuses accommodating a plurality of access lines in a bandwidth control system, multiplexed signal lines of respective bandwidth control apparatuses are connected to one another in cascade. Each bandwidth control apparatus acquires a bandwidth state of the access lines in the own apparatus and notifies the other apparatuses of the bandwidth state of the own apparatus having been acquired. Therefore, the bandwidth control apparatus can allocate a transmission bandwidth to be controlled in the own apparatus using a ratio of the bandwidth state occupied by the own apparatus to a total bandwidth states occupied in the bandwidth control system, and can control transmission bandwidths of the respective access lines accommodated in the own apparatus.

12 Claims, 12 Drawing Sheets

BANDWIDTH CONTROL APPARATUS, BANDWIDTH CONTROL METHOD, BANDWIDTH CONTROL SYSTEM, AND BANDWIDTH ALLOCATING APPARATUS

BACKGROUND OF THE INVENTION

1. Field of the Invention

The present invention relates to a bandwidth control apparatus, a bandwidth control method, a bandwidth control system, and a bandwidth allocating apparatus for data transfer in a subscriber data transmission system, and, more particularly to a bandwidth control apparatus, a bandwidth control method, a bandwidth control system, and a bandwidth allocating apparatus applied to an x Digital Subscriber Line (x DSL: 'x' is a generic term representing 'Asymmetric', 'Symmetric', and 'Very high-bit-rate') and Fiber To The x (FTTX: 'x' is agenericterm representing 'Building', 'Curb', 'Cabinet', and 'Home').

2. Description of the Related Art

The x DSL uses a metallic cable such as a telephone line for a transmission medium serving as an access line to make it possible to perform high-bit-rate data transmission at several Megabits/second, and the FTTx uses an optical fiber cable for a transmission medium to make it possible to perform high-bit-rate data transmission at several tens Megabits/second to hundred Megabits/second.

In recent years, in the subscriber data transmission system using a metallic cable such as a telephone line for a transmission medium serving as an access line, the xDSL technique that makes it possible to perform high-bit-rate data transmission at several Megabits/second attracts attention. In particular, the Asymmetric Digital Subscriber Line (ADSL) attracts much attention. In the ADSL, data transfer bit rates are different in an upstream direction in which a data stream flows from a user terminal to a network and a downstream direction opposite to the upstream direction. This asymmetry is suitable for an access pattern of the Internet. According to the spreads of the ADSL, access lines are rapidly developed into broad bands.

A system constitution of a general data transmission network will be explained with reference to FIG. 1.

FIG. 1 is a diagram showing an example of a network constitution of an Internet connection service to which an Access Multiplexer (AM) is applied. In user premises, Personal Computers (PCs) 111 are connected to subscriber lines 109 serving as access lines via Customer Premises Equipment (CPE) 110. On a switching system side, an Access Multiplexer (AM) 106 that terminates the subscriber lines 109 from the respective user premises and concentrates signals on one high-bit-rate transmission signal 105 is provided.

A Line Termination Unit (LTU) 108 and an Integrated Gateway Unit (IGU) 107 are equipped in the access multiplexer 106. The integrated gateway unit 107 is an apparatus that multiplexes a signal and performs protocol conversion for the signal as required.

The high-bit-rate transmission signal 105 concentrated in the access multiplexer 106 is output to the Internet 103 through a switch or a router 104. The high-bit-rate transmission signal 105 output to the Internet 103 is further transferred to an Internet Service Provider (ISP) server 101 or the like through a switch or a router 102.

An Internet access pattern of a client/server type illustrated in FIG. 1 has a characteristic that upstream traffics are extremely small compared with downstream traffics. Therefore, conventionally, bandwidth control for the upstream traffic in the access multiplexer 106 has not been regarded as so important.

However, in recent years, a communication pattern by Peer to Peer (P2P) communication that connects between the personal computers is increasing. Thus, bandwidth assurance for the upstream traffics and fairness of traffic allocation among users are important.

As represented by the xDSL, a best effort service is often applied to access lines. Therefore, depending on a difference of conditions such as a state of the subscriber lines 109 serving as access lines to be transmission paths and performance of the personal computers 111 that are user terminals, effective rates usable in the respective personal computers 111 fluctuate. In other words, in the respective personal computers 111, an optimum effective rate corresponding to a line state at a certain point is applied. The personal computers 111 perform data communication using an effective rate usable at that point.

In general, in the downstream traffics, the high-bit-rate transmission signal 105 transmitted from the network 103 is often supplied to the respective subscriber lines 109 by a broadcast type transmission for transmitting signals to unspecified number of destinations. The broadcast type transmission uses bandwidth resources of the downstream traffics at the time of transmission collectively for all the access lines rather than separately for the individual access lines. Therefore, in the access multiplexer 106, it is unnecessary to perform bandwidth control of traffics for the respective subscriber lines 109. However, in the upstream traffics, signals transmitted from the subscriber lines 109 are transmitted separately and concentrated in the access multiplexer 106. When bandwidths of the high-bit-rate transmission signal 105 after concentration is limited by an upper limit value of a bit rate defined by interface with the network, it is necessary to perform the bandwidth control for traffics for each of the subscriber lines 109 in the access multiplexer 106 in order to control upstream signals flowing in from the subscriber lines 109.

Usually, the access multiplexer 106 allocates equal bandwidths to the respective subscriber lines 109. However, even if effective rates allocated for some subscriber lines 109 are not fully used and, as a result, there is still a room available for use in bandwidths of the high-bit-rate transmission signal 105 after concentration in the access multiplexer 106, this is not reflected on the allocation of bandwidths to the other subscriber lines 109.

Setting of bandwidths in the access multiplexer 106 is statically performed. Therefore, even if arbitrary users end communication and the subscriber lines 109 of the users have become idle, it is impossible to divert bandwidths allocated to the idle subscriber lines 109 to the subscriber lines 109 used by the other users. The reason why bandwidths are statically set and the users are treated fairly in this way is to simplify a constitution of the access multiplexer 106 and also to be based on an idea that the same level of services should be fairly provided to each user.

On the other hand, there is also an idea that it is preferable to faithfully reflect the conditions such as a state of the subscriber lines 109 and performance of the personal computers 111 on allocation of bandwidths for each subscriber line 109 and effectively use bandwidths of the high-bit-rate transmission signal 105 after concentration. However, in order to realize this idea, a constitution of the access multiplexer 106 is inevitably complicated.

As a related technical document, a technique concerning the xDSL entitled "Data Transmission Network" is disclosed in Japanese Patent Application Laid-Open No. 2004-519974, which is corresponding to the International Publication No. WO 02/089459 A1 of the PCT. This technology relates to a data transmission network for data transmission which allows xDSL data transmission and voice data transmission between a backbone network and a network termination device on any data transmission medium such as a copper telephone line. However, the document does not disclose a technique related to bandwidth control.

SUMMARY OF THE INVENTION

The present invention has been made in view of the circumstances and it is an object of the invention to provide a bandwidth control apparatus, a bandwidth control method, a bandwidth control system, and a bandwidth allocating apparatus that make it possible to realize effective utilization of bandwidths for data transmission in a subscriber data transmission system.

In order to attain such an object, the present invention has the following characteristics.

A bandwidth control system includes a plurality of bandwidth control apparatuses that accommodate a plurality of access lines to which user terminals are connected, and multiplexed signal lines of respective bandwidth control apparatuses are connected to one another in cascade. Each bandwidth control apparatus in the bandwidth control system acquires a bandwidth state of the access lines accommodated in the own bandwidth control apparatus and notifies the other bandwidth control apparatuses of the bandwidth state of the own bandwidth control apparatus acquired. This means that respective bandwidth control apparatuses are aware of both of bandwidth states of own apparatus and other apparatuses. Therefore, the bandwidth control apparatus can allocate a transmission bandwidth to be controlled in the own bandwidth control apparatus using a ratio of the bandwidth state occupied by the own bandwidth control apparatus to a total bandwidth states occupied in the bandwidth control system, and control transmission bandwidths of the respective access lines accommodated in the own bandwidth control apparatus.

The bandwidth control apparatus according to the present invention comprises a first bandwidth state acquiring unit that collects bandwidth states of the respective access lines and acquires a bandwidth state in the own bandwidth control apparatus, a second bandwidth state acquiring unit that acquires bandwidth states in other bandwidth control apparatuses, a bandwidth state allocating unit that allocates a transmission bandwidth to be controlled in the own bandwidth control apparatus, on the basis of the bandwidth state in the own bandwidth control apparatus and the bandwidth states in the other bandwidth control apparatuses, and a bandwidth state control unit that controls transmission bandwidths of the respective access lines on the basis of the transmission bandwidth allocated by the bandwidth state allocating unit.

According to the present invention, it is possible to reflect operation states of respective access lines and effective rates of the access lines on bandwidth distribution faithfully and on a real time basis using a bandwidth control apparatus having a simple constitution. Therefore, compared with static setting control, it is possible to accurately realize fairness and effectively use all bandwidths of a high-bit-rate transmission signal after concentration without waste.

BRIEF DESCRIPTION OF THE DRAWINGS

Exemplary features and advantages of the present invention will become apparent from the following detailed description when taken with the accompanying drawings in which.

DESCRIPTION OF THE EXEMPLARY EMBODIMENTS

A bandwidth control system according to a first exemplary aspect of the present invention will be schematically explained.

Figure 1:
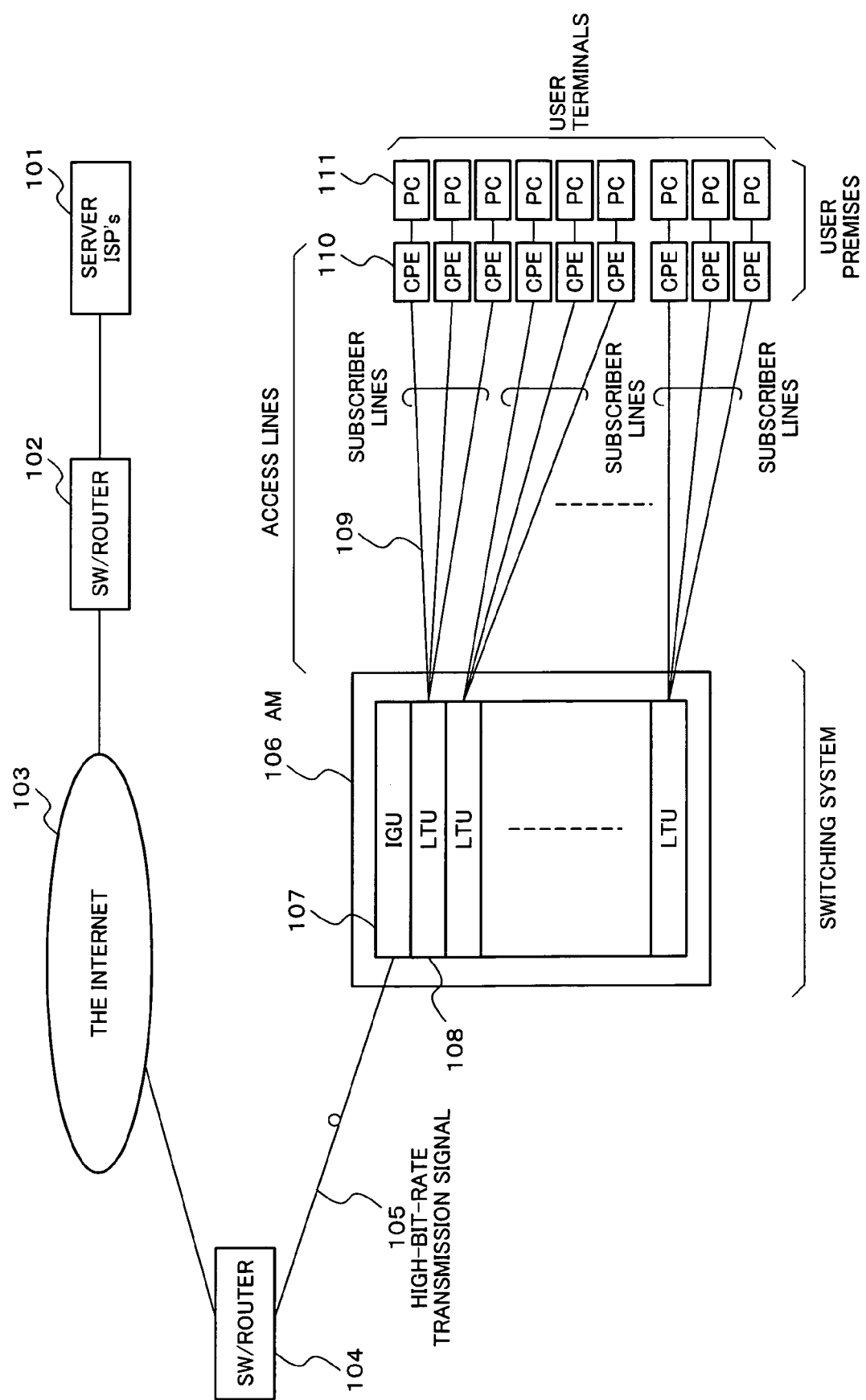
FIG. 1 is a diagram showing an example of a network constitution of an Internet connection service to which an access multiplexer is applied.
Figure 2:
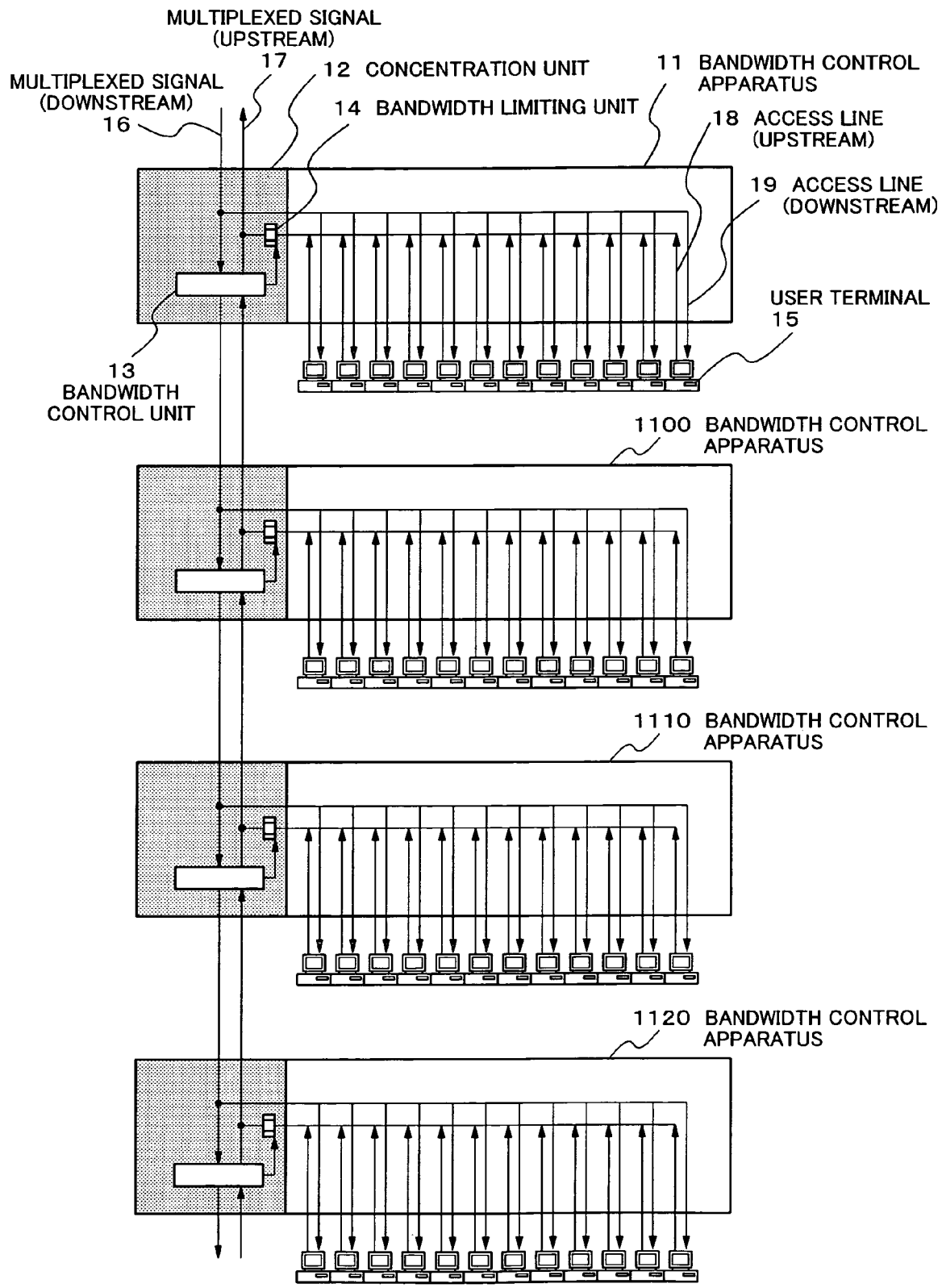
FIG. 2 is a diagram showing a system constitution of a bandwidth control system according to a first exemplary aspect of the present invention.

FIG. 2 is a diagram showing a system constitution of the bandwidth control system according to the first exemplary aspect of the present invention. As shown in FIG. 2, in the bandwidth control system according to this exemplary aspect, a plurality of bandwidth control apparatuses 11, 1100, 1110, and 1120 for controlling bandwidth states of data traffics flowing on access lines 18 and 19 are provided, and the respective bandwidth control apparatuses are connected in cascade. Each bandwidth control apparatus accommodates a plurality of user terminals 15, which perform data communication via a network (not shown), through the access lines 18 and 19. The respective bandwidth control apparatuses correspond to the Access Multiplexer (AM) 106 referred to in FIG. 1. The respective bandwidth control apparatuses have a function of terminating the respective access lines, concentrating upstream signals of the respective access lines on a high-bitrate transmission-signal to transmit the high-bit-rate transmission signal to the network and broadcasting a high-bit-rate transmission signal received from the network to the respective access lines as downstream signals. In the following explanation, the high-bit-rate transmission signal is referred to as a multiplexed signal.

The bandwidth control apparatus 11 collects and acquires bandwidth states of the respective access lines 18 and 19 accommodated therein. Subsequently, the bandwidth control apparatus 11 acquires bandwidth states of access lines accommodated in the adjacent respective bandwidth control apparatuses 1100, 1110, and 1120, which have been acquired in the same manner in the respective adjacent bandwidth control apparatuses 1100, 1110, and 1120. The bandwidth control apparatus 11 allocates allowable bandwidth states to the user terminals accommodated in the bandwidth control apparatus 11 on the basis of both of the bandwidth state acquired in the bandwidth control apparatus 11 and the bandwidth states acquired in the respective adjacent bandwidth control apparatuses 1100, 1110, and 1120. Then, the bandwidth control apparatus 11 controls the bandwidth states of the respective access lines 18 and 19 on the basis of the bandwidth states allocated. The other bandwidth control apparatuses 1100, 1110, and 1120 perform the same control. Each of the bandwidth control apparatuses grasps all bandwidth states not only in the own bandwidth control apparatus but also in other bandwidth control apparatuses connected in cascade and, then, controls a bandwidth state for access lines of the bandwidth control apparatus. Therefore, the bandwidth control system according to this exemplary aspect is capable of controlling the bandwidth states of the respective access lines using an optimum bandwidth state and realizing effective utilization of bandwidths.

The bandwidth control system and the bandwidth control apparatus according to this exemplary aspect will be hereinafter explained with reference to the accompanying drawings.

As described above, the bandwidth control system according to this exemplary aspect includes the plurality of bandwidth control apparatuses connected in cascade. In FIG. 2, the four bandwidth control apparatuses 11, 1100, 1110, and 1120 are illustrated. However, the number of bandwidth control apparatuses connected in cascade is not limited. The access line 18 indicates an upstream access line and the access line 19 indicates a downstream access line. The access lines 18 and 19 indicate flows of signals. A physical constitution of the access lines 18 and 19 is not specifically limited. The access lines 18 and 19 may be physically constituted by one transmission medium or a plurality of transmission media.

Reference numeral 12 in FIG. 2 denotes a concentration unit mounted on the respective bandwidth control apparatuses 11, 1100, 1110, and 1120.

The concentration unit 12 concentrates upstream signals input from the respective access lines accommodated in the bandwidth control apparatus 11 and upstream signals input from the bandwidth control apparatus 1100 located in a downstream direction, and outputs the signals as an upstream multiplexed signal 17. A downstream multiplexed signal 16 input to the concentration unit 12 is branched into two flows, one is broadcasted to the access lines accommodated in the bandwidth control apparatus 11 as downstream signals, and the other flow is output from the concentration unit 12 as the downstream signals to be provided to the bandwidth control apparatuses located in the downstream direction. In other words, upstream signals from the access lines accommodated in each of the bandwidth control apparatuses and upstream signals from the bandwidth control apparatus located in the downstream direction of this bandwidth control apparatus are multiplexed. The multiplexing is repeated in the respective bandwidth control apparatuses. Finally, the upstream signals are output as an upstream multiplexed signal to a network (not shown). Similarly, the downstream multiplexed signal is branched into two flows in the respective bandwidth control apparatuses, and one flow is broadcasted to the own access lines, and the other flow is provided to the bandwidth control apparatuses located in the downstream direction. Finally, the downstream signal is supplied to the access lines of the bandwidth control apparatus located in the end of the cascade connection.

Reference numeral 13 denotes a bandwidth control unit that controls an overall function of the bandwidth control apparatus according to the present invention. Details of the bandwidth control unit 13 will be described later. Reference numeral 14 denotes a bandwidth limiting unit, which has a function of limiting bandwidths of upstream signals of the respective access lines.

The bandwidth control system according to this exemplary aspect constituted as described above is characterized by controlling bandwidth distribution for upstream access lines faithfully and on a real time basis taking into account upstream operation states of the respective access lines (use/non-use of the access lines) accommodated in the respective bandwidth control apparatuses or effective rates used in the respective access lines. In other words, the bandwidth control system according to this exemplary aspect is capable of dynamically controlling bandwidths of a plurality of bandwidth control apparatuses and realizing fairness and weighting of bandwidth allocation.

Figure 7:
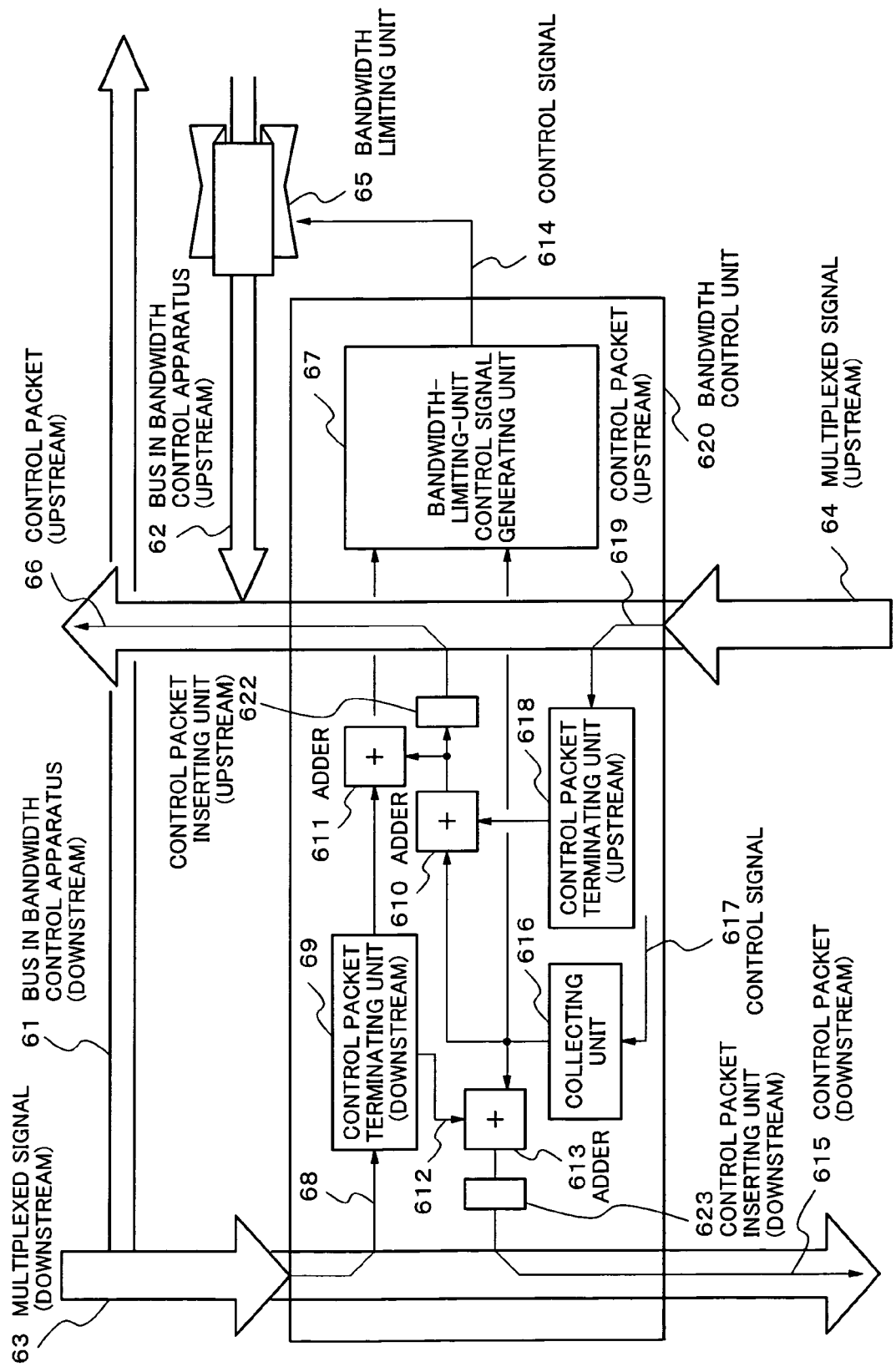
FIG. 7 is a diagram showing an internal structure of a bandwidth control unit shown in FIGS. 2 to 6.

The bandwidth control unit 13 shown in FIG. 2 will be explained with reference to FIG. 7. FIG. 7 is a diagram showing an internal structure of the concentration unit 12 including the bandwidth control unit 13 shown in FIG. 2. In FIG. 7, reference numeral 620 corresponds to the bandwidth control unit 13 in FIG. 2 and reference numeral 65 corresponds to the bandwidth limiting unit 14 in FIG. 2.

Reference numeral 63 denotes a downstream multiplexed signal input to the bandwidth control apparatus from the network or the bandwidth control apparatus located in the upstream direction. Reference numeral 64 denotes an upstream multiplexed signal input to the bandwidth control apparatus from the bandwidth control apparatus located in the downstream direction. Reference numeral 61 denotes a bus in bandwidth control apparatus in the downstream direction in which downstream signals broadcast to the access lines are fed. Reference numeral 62 denotes a bus in bandwidth control apparatus in the upstream direction in which upstream signals from the respective access lines are transmitted.

Reference numeral 69 denotes a downstream control packet terminating unit that receives a control packet transmitted from the bandwidth control apparatus located in the upstream direction. Reference numeral 618 denotes an upstream control packet terminating unit that receives a control packet transmitted from the bandwidth control apparatus located in the downstream direction. Reference numeral 622 denotes an upstream control packet inserting unit that inserts a control packet to be transmitted to the bandwidth control apparatus located in the upstream direction. Reference numeral 623 denotes a downstream control packet inserting unit that inserts a control packet to be transmitted to the bandwidth control apparatus located in the downstream direction.

Reference numerals 610, 611, and 613 denote adders that add values indicating bandwidth states described later. Reference numeral 67 denotes a bandwidth-limiting-unit control signal generating unit, which controls the bandwidth limiting unit 65 using a control signal 614. Reference numeral 616 denotes a collecting unit, which collects bandwidth states of the respective access lines in the bandwidth control apparatus using a control signal 617. Reference numerals 68 and 615 denote flows of downstream control packets. Reference numerals 619 and 66 denote flows of upstream control packets.

Figure 3:
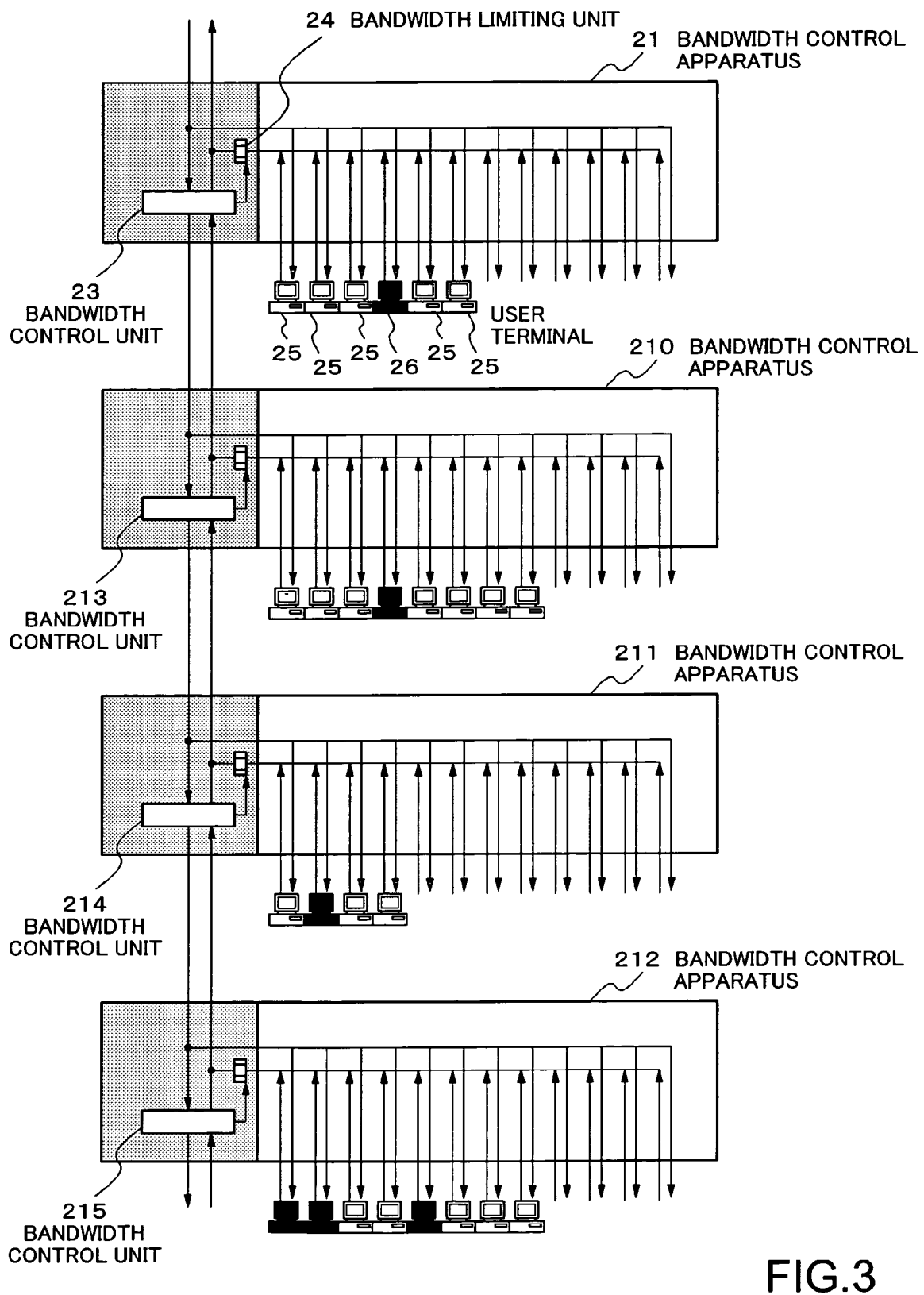
FIG. 3 is a first diagram showing a series of processing operations in the bandwidth control system according to the first exemplary aspect.

A series of processing operations in the bandwidth control system according to this exemplary aspect will be explained with reference to FIG. 3. In FIG. 3, states of upstream access lines are shown in a form of symbols indicating user terminals.

For example, a symbol denoted by reference numeral 25 indicates a user terminal for which the upstream access line is in an active state. A symbol denoted by reference numeral 26 indicates a user terminal for which the upstream access line is in a line disconnection state. An access line without a symbol indicating a user terminal indicates that no user terminal is connected to the access line and the access line is not operated.

As shown in FIG. 3, the numbers of user terminals connected to four bandwidth control apparatuses 21, 210, 211, and 212 are six, eight, four, and eight, respectively. Among the user terminals, the numbers of user terminals for which access lines are in the active state are five, seven, three, and five, respectively. The numbers of user terminals for which access lines are in the line disconnection state are one, one, one, and three, respectively.

A maximum number of user terminals (a maximum number of lines accommodated) can be connected to each of the bandwidth control apparatuses 21, 210, 211, and 212 are twelve.

A control operation by a bandwidth control unit 23, 213, 214, or 215 of each of the bandwidth control apparatuses 21, 210, 211, and 212 at the time when states of the respective access lines are the state shown in FIG. 3 will be explained with reference to FIG. 7.

First, the collecting unit 616 collects states of the access lines accommodated in the bandwidth control apparatus via the control signal 617 and accumulates the number of lines in the active state.

The control packet terminating units 618 and 69 receive control packets transmitted from adjacent bandwidth control apparatuses, respectively, and acquire the number of lines in the active state among the access lines accommodated in the other bandwidth control apparatuses. Specifically, the control packet terminating unit 618 receives the control packet 619 included in the upstream multiplexed signal 64 from the bandwidth control apparatus located in the downstream direction connected in cascade. The control packet terminating unit 69 receives the control packet 68 included in the downstream multiplexed signal 63 from the bandwidth control apparatus in the upstream direction connected in cascade.

The adders 613 and 610 add the number of access lines in the active state in the bandwidth control apparatus accumulated by the collecting unit 616 and the numbers of lines in the active states among the access lines accommodated in the other bandwidth control apparatuses acquired by the control packet terminating units 618 and 69. The bandwidth control unit transmits a result of the addition to the adjacent bandwidth control apparatuses. Specifically, the adder 610 adds the number of access lines in the active states in the bandwidth control apparatus accumulated by the collecting unit 616 and the number of lines in the active states among the access lines accommodated in the bandwidth control apparatus in the downstream direction acquired by the control packet terminating unit 618. The control packet inserting unit 622 inserts the control packet 66 indicating a result of the addition. The bandwidth control unit transmits the control packet 66 to the bandwidth control apparatus located in the upstream direction. The adder 613 adds the number of access lines in the active state in the bandwidth control apparatus accumulated by the collecting unit 616 and the number of lines in the active state among the access lines accommodated in the bandwidth control apparatus located in the upstream direction acquired by the control packet terminating unit 69. The control packet inserting unit 623 inserts the control packet 615 indicating a result of the addition. The bandwidth control unit transmits the control packet 615 to the bandwidth control apparatus located in the downstream direction.

The bandwidth control apparatuses 21 and 212 shown in FIG. 3 are at both the ends of the cascade connection. Thus, the bandwidth control apparatuses 21 and 212 have only one adjacent bandwidth control apparatus connected thereto, respectively. Therefore, the bandwidth control apparatuses 21 and 212 at the ends acquire the control packet only from one bandwidth control apparatus located in the downstream direction or the upstream direction. The bandwidth control apparatus 21, which is located at the most upstream position of the cascade connection, interfaces with a network (not shown).

For example, in the case of the connection state shown in FIG. 3, the numbers of active lines among the access lines accommodated in the respective bandwidth control apparatuses are accumulated in two direction, namely, a direction from the bandwidth control unit 23 to 213, to 214 to 215 and a direction from the bandwidth control unit 215 to 214, to 213 to 23. The accumulated number of active lines is transmitted by a control packet.

Figure 4:
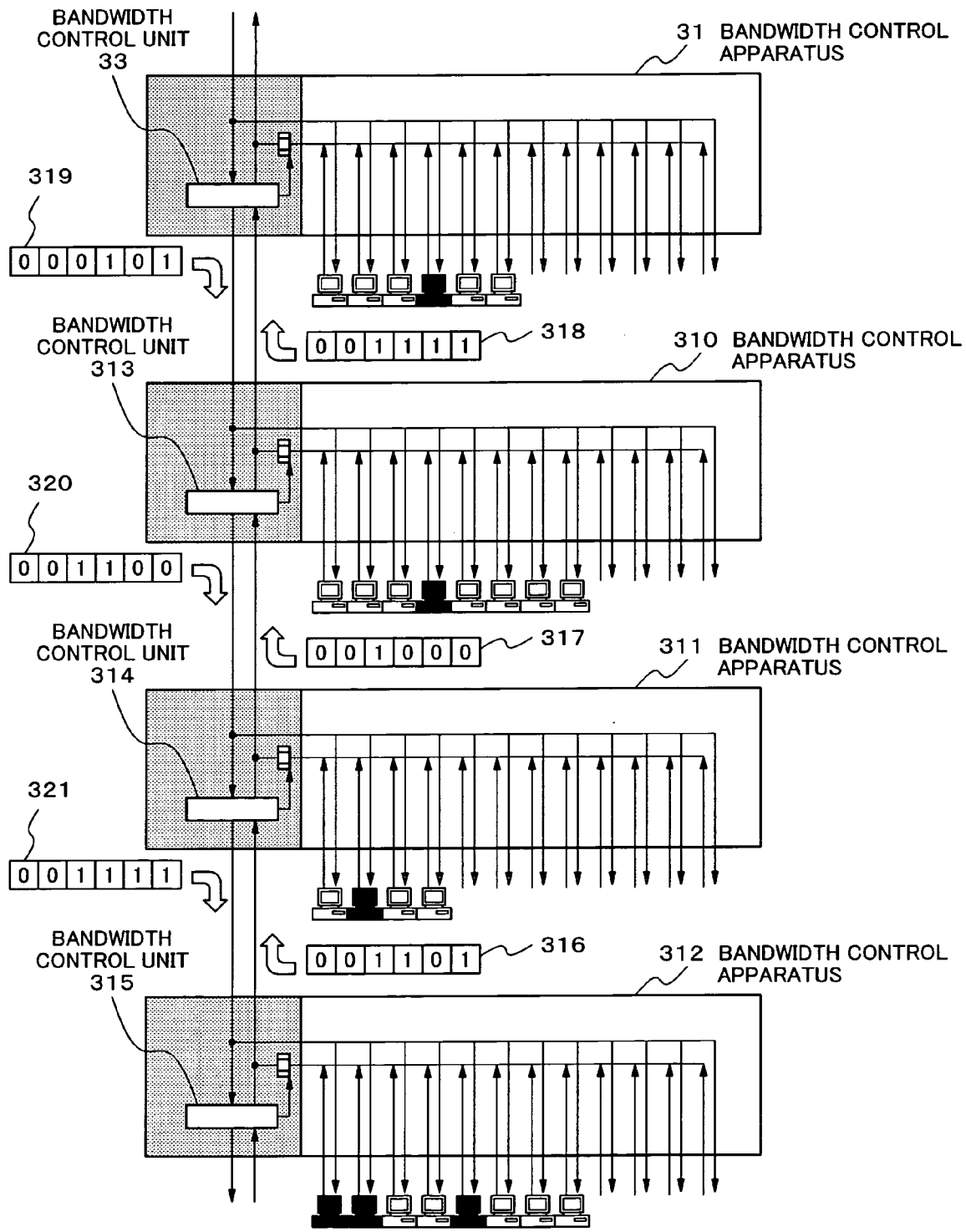
FIG. 4 is a second diagram showing a series of processing operations in the bandwidth control system according to the first exemplary aspect.

FIG. 4 is a diagram showing a state in which the numbers of active lines transmitted by control packets output from respective bandwidth control apparatuses are represented by binary numbers.

In FIG. 4, reference numeral 316 indicates the number of active lines "5" output from a bandwidth control apparatus 312 to a bandwidth control apparatus 311 located in the upstream position. Reference numeral 317 indicates the number of active lines "8" output from the bandwidth control apparatus 311 to a bandwidth control apparatus 310 located in the upstream direction. Reference numeral 318 indicates the number of active lines "15" output from the bandwidth control apparatus 310 to a bandwidth control apparatus 31 located in the upstream direction. Reference numeral 319 indicates the number of active lines "5" output from the bandwidth control unit 31 to the bandwidth control apparatus 310 located in the downstream direction. Reference numeral 320 indicates the number of active lines "12" output from the bandwidth control apparatus 310 to the bandwidth control apparatus 311 located in the downstream direction. Reference numeral 321 indicates the number of active lines "15" output from the bandwidth control apparatus 311 to the bandwidth control apparatus 312 located in the downstream direction.

For example, the bandwidth control apparatus 310 receives information on the number "5" from the bandwidth control apparatus 31 located in the upstream direction and receives information on the number "8" from the bandwidth control apparatus 311 located in the downstream direction. The number "5" indicates the number of active lines of the bandwidth control apparatus 31. The number "8" indicates a value obtained by adding the number of active lines "5" notified from the bandwidth control apparatus 312 to the number of active lines "3" of the bandwidth control apparatus 311.

The bandwidth control apparatus 310 is aware of the number of active lines "7" in the own bandwidth control apparatus. It is possible to calculate the number of all active lines "7+5+8=20" in the system shown in FIG. 4 and a ratio "7/20" of the number of active lines occupied by the bandwidth control apparatus in the system by adding the information on the number "5" acquired from the adjacent bandwidth control apparatus 31 and the information on the number "8" acquired from the adjacent bandwidth control apparatus 311.

A unit that executes the calculation processing described above is the bandwidth-limiting-unit control signal generating unit 67 shown in FIG. 7.

Taking the bandwidth control apparatus 310 as an example, the adder 610 adds the number of active lines "7" in the bandwidth control apparatus acquired by the collecting unit 616 and the information on the number "8", which is transmitted from the bandwidth control apparatus 311 in the downstream direction, acquired by the control packet terminating unit 618. The adder 611 adds a result of the addition "15" and the information on the number "5", which is transmitted from the bandwidth control apparatus 31 in the upstream direction, acquired by the control packet terminating unit 69. The adder 611 inputs a result of the addition "20" to the bandwidth-limiting-unit control signal generating unit 67 together with the information "7" of the number of active lines in the bandwidth control apparatus. The bandwidth-limiting-unit control signal generating unit 67 calculates a ratio "7/20" of the number of active lines occupied by the own bandwidth control apparatus in the system. The bandwidth-limiting-unit control signal generating unit 67 controls the bandwidth limiting unit 65 using the control signal 614 on the basis of a result of the calculation. As the result, bandwidths of the access lines are controlled so as to transmit data of an appropriate volume from the bandwidth control apparatus 310.

When assuming a bit rate of a multiplexed signal in the upstream direction interfacing with the network is 100 Mbps, since the number of all active lines in the bandwidth control system is 20 (5+7+3+5), bandwidths are allocated to the respective bandwidth control apparatuses as described below. 25 Mbps (100 Mbps×5/20) is allocated to the bandwidth control apparatus 31, 35 Mbps (100 Mbps×7/20) is allocated to the bandwidth control apparatus 310, 15 Mbps (100 Mbps×3/20) is allocated to the bandwidth control apparatus 311, and 25 Mbps (100 Mbps×5/20) is allocated to the bandwidth control apparatus 312. In other words, the bandwidth control units 33, 313, 314, and 315 have a function of adjusting a transmission volume from the respective bandwidth control apparatuses.

In the respective bandwidth control apparatuses, the bandwidth control units control bandwidths to equally allocate the bandwidths to access lines in the active state. As a result, a bandwidth of 5 Mbps is allocated to the respective access lines in the active state. Therefore, in this example of bandwidth control, a bandwidth of an access line with an effective rate exceeding 5 Mbps is limited to 5 Mbps.

The example described above is based on two values indicating active or disconnected as a state of an access line. In general, when the number of accommodated access lines of bandwidth control apparatuses is n (n is an integer) and the number of cascades of the bandwidth control apparatuses is m (m is an integer), ([log(n×(m−1))]+1) bits are necessary in order to notify the number of active lines among the bandwidth control apparatuses. [ ] is a Gaussian symbol and a base of the logarithm is 2. When (n×(m−1)) is a power of 2, '+1' after the Gaussian symbol is unnecessary. In other words, ([log(n×(m−1))]) bits are necessary. In the example of a constitution shown in FIG. 4, ([log(12×(4−1))]+1)=6 bits are necessary.

Figure 5:
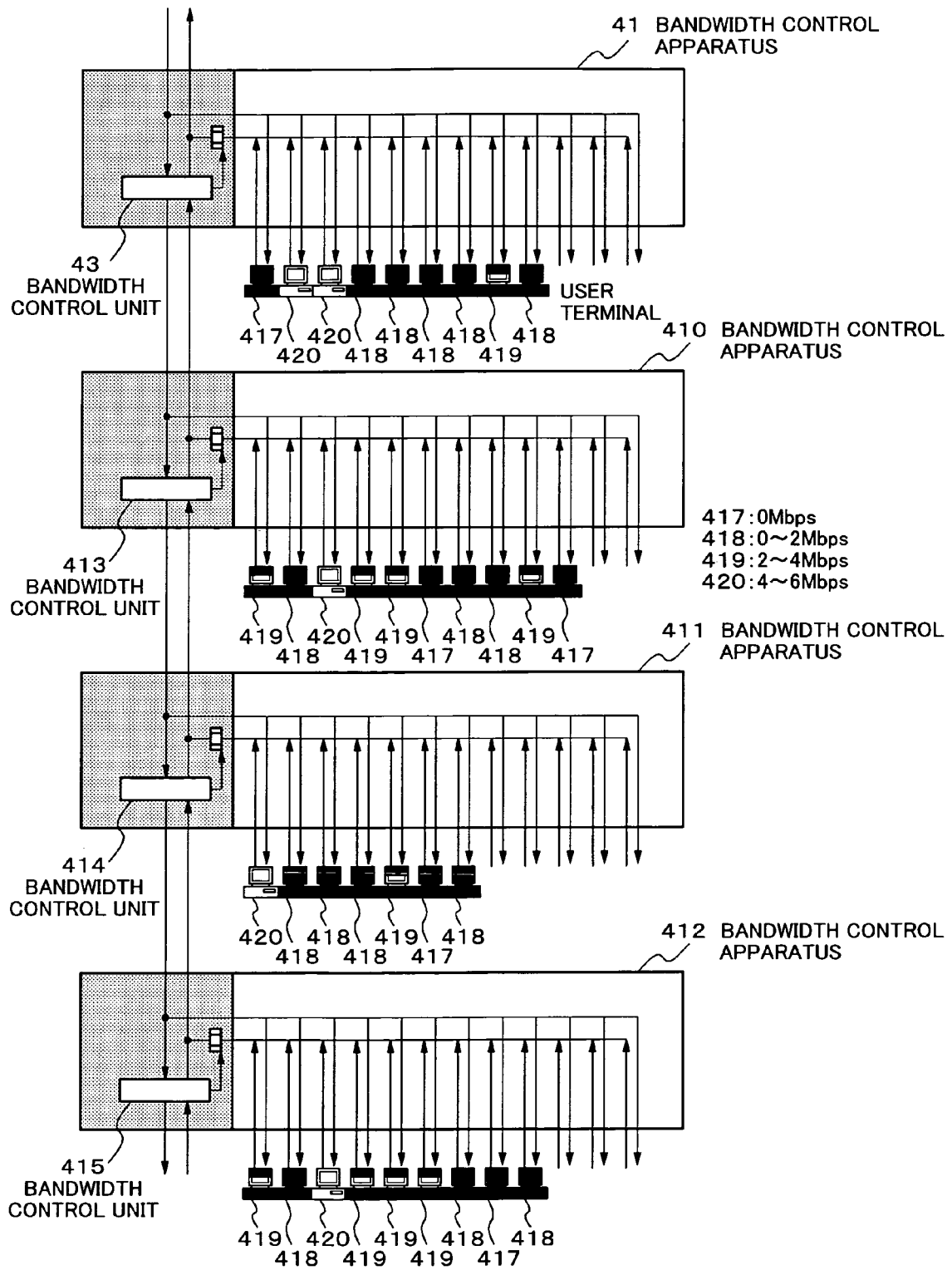
FIG. 5 is a third diagram showing a series of processing operations in the bandwidth control system according to the first exemplary aspect.

Fine adjustment applied to bandwidth control according to effective rates of respective access lines will be explained with reference to FIGS. 5 and 6. In FIG. 5, states of upstream access lines are shown in a form of symbols indicating user terminals.

Effective rates of upstream access lines are classified into four, namely, 0 Mbps (line disconnection), 0 Mbps to 2 Mbps, 2 Mbps to 4 Mbps, and 4 Mbps to 6 Mbps. In FIG. 5, a symbol of reference numeral 417 indicates an access line in a state of the effective rate 0 Mbps (line disconnection). A symbol of reference numeral 418 indicates an access line in a state of the effective rate 0 Mbps to 2 Mbps. A symbol of reference numeral 419 indicates an access line in a state of the effective rate 2 Mbps to 4 Mbps. A symbol of reference numeral 420 indicates an access line of a state of the effective rate 4 Mbps to 6 Mbps. An access line to which a user terminal is not connected indicates that the line is not operated. The numbers of user terminals connected to four bandwidth control apparatuses 41, 410, 411, and 412 are nine, ten, seven, and nine, respectively.

A control operation of a bandwidth control unit 43, 413, 414, or 415 of each of the bandwidth control apparatuses 41, 410, 411, and 412 at the time of a line state shown in FIG. 5 will be explained with reference to FIG. 7.

First, the collecting unit 616 collects lines states of respective access lines accommodated in the bandwidth control apparatus using the control signal 617. The collecting unit 616 classifies and accumulates effective rates of access lines in the active state. In this case, the effective rates 0 Mbps (line disconnection), 0 Mbps to 2 Mbps, 2 Mbps to 4 Mbps, and 4 Mbps to 6 Mbps are calculated as weighted values of "0", "1", "2", and "3", respectively.

For example, in the bandwidth control apparatus 410 shown in FIG. 5, there are two lines with the effective rate 0 Mbps (line disconnection) (417), three lines with the effective rate 0 Mbps to 2 Mbps (418), four lines with the effective rate 2 Mbps to 4 Mbps (419), and one line with the effective rate 4 Mbps to 6 Mbps (420). Thus, an accumulated value is "0×2"+"1×3"+"2×4"+"3×1"="14".

The control packet terminating units 618 and 69 receive control packets from adjacent bandwidth control apparatuses, respectively, and acquire accumulated values of effective rates of respective access lines accommodated in the other bandwidth control apparatuses. Specifically, the control packet terminating unit 618 receives the control packet 619 included in the upstream multiplexed signal 64 from a bandwidth control apparatus located in the downstream direction connected in cascade. The control packet terminating unit 69 receives the control packet 68 included in the downstream multiplexed signal 63 from a bandwidth control apparatus located in the upstream direction connected in cascade.

The adders 613 and 610 add the accumulated value of the effective rates in the own bandwidth control apparatus classified and accumulated by the collecting unit 616 and the accumulated value of the effective rates of the access lines accommodated in the other bandwidth control apparatuses acquired by the control packet terminating units 618 and 69. The bandwidth control unit transmits a result of the addition to the adjacent bandwidth control apparatuses. Specifically, the adder 610 adds the accumulated value of the effective rates in the bandwidth control apparatus classified and accumulated by the collecting unit 616 and the accumulated value of the effective rates of the access lines accommodated in the bandwidth control apparatus located in the downstream direction acquired by the control packet terminating unit 618. The control packet inserting unit 622 inserts the control packet 66 indicating a result of the addition. The bandwidth control unit transmits the control packet 66 to the bandwidth control apparatus located in the upstream direction. The adder 613 adds the accumulated value of the effective rates in the own bandwidth control apparatus classified and accumulated by the collecting unit 616 and the accumulated value of the effective rates of the access lines accommodated in the bandwidth control apparatus located in the upstream direction acquired by the control packet terminating unit 69. The control packet inserting unit 623 inserts the control packet 615 indicating a result of the addition. The bandwidth control unit transmits the control packets 615 to the bandwidth control apparatus located in the downstream direction.

The two bandwidth control apparatuses 41 and 412 shown in FIG. 5 are at both the ends of the cascade connection. Thus, the bandwidth control apparatuses 41 and 412 have only one adjacent bandwidth control apparatus connected thereto, respectively. Therefore, the bandwidth control apparatuses 41 and 412 at the ends acquire the control packet only from one bandwidth control apparatus located in the downstream direction or the upstream direction.

For example, in the case of the connection state shown in FIG. 5, the accumulated values of the effective rates are accumulated and transmitted in two directions, namely, a direction from the bandwidth control unit 43 to 413 to 414 to 415 and a direction from the bandwidth control unit 415 to 414 to 413 to 43.

Figure 6:
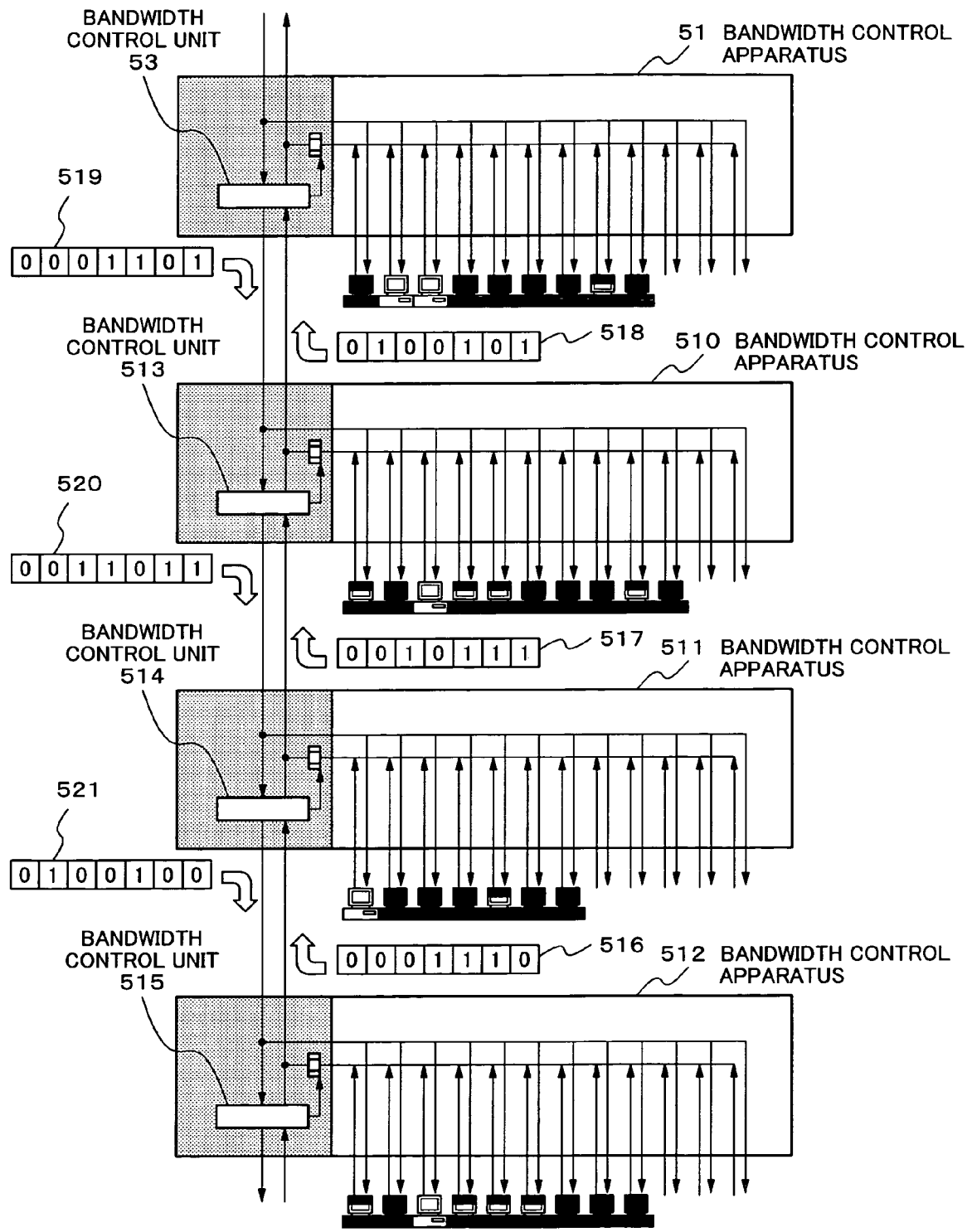
FIG. 6 is a fourth diagram showing a series of processing operations in the bandwidth control system according to the first exemplary aspect.

FIG. 6 is a diagram showing a state in which the accumulated values of the effective rates inserted in the control packets are represented by binary numbers.

In FIG. 6, reference numeral 516 indicates an accumulated value 14 of effective rates output from a bandwidth control apparatus 512 to a bandwidth control apparatus 511 located in the upstream direction. Reference numeral 517 indicates an accumulated value 23 of effective rates output from the bandwidth control apparatus 511 to a bandwidth control apparatus 510 located in the upstream direction. Reference numeral 518 indicates an accumulated value 37 of effective rates output from the bandwidth control apparatus 510 to a bandwidth control apparatus 51 located in the upstream direction. Reference numeral 519 indicates an accumulated value 13 of effective rates output from the bandwidth control apparatus 51 to the bandwidth control apparatus 510 located in the downstream direction. Reference numeral 520 indicates an accumulated value 27 of effective rates output from the bandwidth control apparatus 510 to the bandwidth control apparatus 511 located in the downstream direction. Reference numeral 521 indicates an accumulated value 36 of effective rates output from the bandwidth control apparatus 511 to the bandwidth control apparatus 512 located in the downstream direction.

For example, the bandwidth control apparatus 510 receives information on the number "13" from the bandwidth control apparatus 51 located in the upstream direction and receives information on the number "23" from the bandwidth control apparatus 511 located in the downstream direction.

The number "13" corresponds to a total of the effective rates of the bandwidth control apparatus 51. The number "23" corresponds to a total of the effective rates of the bandwidth control apparatus 512 and the bandwidth control apparatus 511. Note that these totals are not total values themselves of the effective rates but are, as described above, weighted total values obtained by classifying the effective rates into three stages (the effective rate zero, that is, line disconnection is not included in the stages) and giving numerical values 1 to 3 to the effective rates according to the stages classified.

The bandwidth control apparatus 510 is aware of the total "14" of the effective rates in the bandwidth control apparatus 510. It is possible to calculate a total value "50" of the effective rates of all access lines in the system shown in FIG. 6 and a ratio "14/50" of the total value of the effective rates occupied by the bandwidth control apparatus 510 in the system by adding the information "36" obtained from the adjacent bandwidth control apparatuses 51 and 511 to the total "14"

A unit that executes the calculation processing described above is the bandwidth-limiting-unit control signal generating unit 67 shown in FIG. 7.

Taking the bandwidth control apparatus 510 as an example, the adder 610 adds the total "14" of the effective rates in the bandwidth control apparatus acquired by the collecting unit 616 and the information on the number "23", which is transmitted from the bandwidth control apparatus 511 in the downstream direction, acquired by the control packet terminating unit 618. The adder 611 adds a result of the addition "37" and the information on the number "13", which is transmitted from the bandwidth control apparatus 51 in the upstream direction, acquired by the control packet terminating unit 69. The adder 611 inputs a result of the addition "50" to the bandwidth-limiting-unit control signal generating unit 67 together with the information on the number "14" of the total of the effective rates in the bandwidth control apparatus. The bandwidth-limiting-unit control signal generating unit 67 calculates a ratio "14/50" of the total of the effective rates occupied by the bandwidth control apparatus in the system. The bandwidth-limiting-unit control signal generating unit 67 controls the bandwidth limiting unit 65 using the control signal 614 on the basis of a result of the calculation. As the result, bandwidths of the access lines are controlled so as to transmit data of an appropriate volume from the bandwidth control apparatus 510.

When assuming a bit rate of a multiplexed signal in the upstream direction interfacing with the network is 100 Mbps, since the total of the effective rates of all access lines in the system is "50", bandwidths are allocated to the respective bandwidth control apparatuses as described below. 26 Mbps (100 Mbps×13/50) is allocated to the bandwidth control apparatus 51, 28 Mbps (100 Mbps×14/50) is allocated to the bandwidth control apparatus 510, 18 Mbps (100 Mbps×9/50) is allocated to the bandwidth control apparatus 511, and 28 Mbps (100 Mbps×14/50) is allocated to the bandwidth control apparatus 512.

The bandwidth control units adjust transmission capacities from the respective bandwidth control apparatuses. In the respective bandwidth control apparatuses, the bandwidth control units allocate bandwidths to access lines in the active state to proportionally distribute the bandwidths according to respective effective rates. As a result, a bandwidth of 0 Mbps is allocated to lines with the effective rate 0 Mbps (line disconnection), a bandwidth of 2 Mbps is allocated to lines of the effective rate 0 Mbps to 2 Mbps, a bandwidth of 4 Mbps is allocated to lines with the effective rate 2 Mbps to 4 Mbps, and a bandwidth of 6 Mbps is allocated to lines with the effective rate 4 Mbps to 6 Mbps. Therefore, in this example of bandwidth control, even in a line with an effective rate exceeding 6 Mbps, a bandwidth is limited to 6 Mbps.

In the method described above, the effective rates of the access lines are classified into three stages and the classified stages are weighted to distribute bandwidths. In general, when effective rates of respective access lines are classified into p stages (p is an integer), the number of accommodated lines of bandwidth control apparatuses is set to n (n is an integer), and the number of cascades of the bandwidth control apparatuses is m (m is an integer), $([\log(p \times n \times (m-1))]+1)$ bits are necessary in order to notify a total value of the effective rates among the bandwidth control apparatuses. [ ] is a Gaussian symbol and a base of the logarithm is 2. When (p×n×(m−1)) is a power of 2, '+1' after the Gaussian symbol is unnecessary. In other words, ([log(p×n×(m−1))]) bits are necessary. In the example in FIG. 6, ([log(3×12×(4−1))]+1)=7 bits are necessary.

In this way, the bandwidth control system according to this exemplary aspect is capable of controlling bandwidth distribution faithfully and on a real time basis according to operation states of respective access lines and effective rates of the respective access lines using a bandwidth control apparatus having a simple constitution. Therefore, compared with static setting control, it is possible to accurately realize fairness among the access lines and effectively utilize all bandwidths of a multiplexed signal without waste.

(Second Exemplary Aspect)

A second exemplary aspect of the present invention will be explained.

The bandwidth control system according to the first exemplary aspect adopts a distributed control system in which the bandwidth control unit 620 shown in FIG. 7 is provided for each bandwidth control apparatus and bandwidth control is performed for each bandwidth control apparatus using the bandwidth control unit 620. A bandwidth control system according to the second exemplary aspect is characterized in that a centralized control system is adopted. In the centralized control system, information on states of access lines and effective rates of the access lines is collected in one bandwidth control apparatus, distribution of bandwidths is determined in the bandwidth control apparatus, bandwidth distribution having been determined is notified to respective bandwidth control apparatuses, and the respective bandwidth control apparatuses perform bandwidth control on the basis of information notified. This makes it possible to allocate bandwidths in the respective bandwidth control apparatuses (bandwidth control apparatuses on a controlled side) using only one bandwidth control apparatus (a bandwidth control apparatus on a controlling side). The second exemplary aspect will be hereinafter explained with reference to FIGS. 8 to 11.

Figure 8:
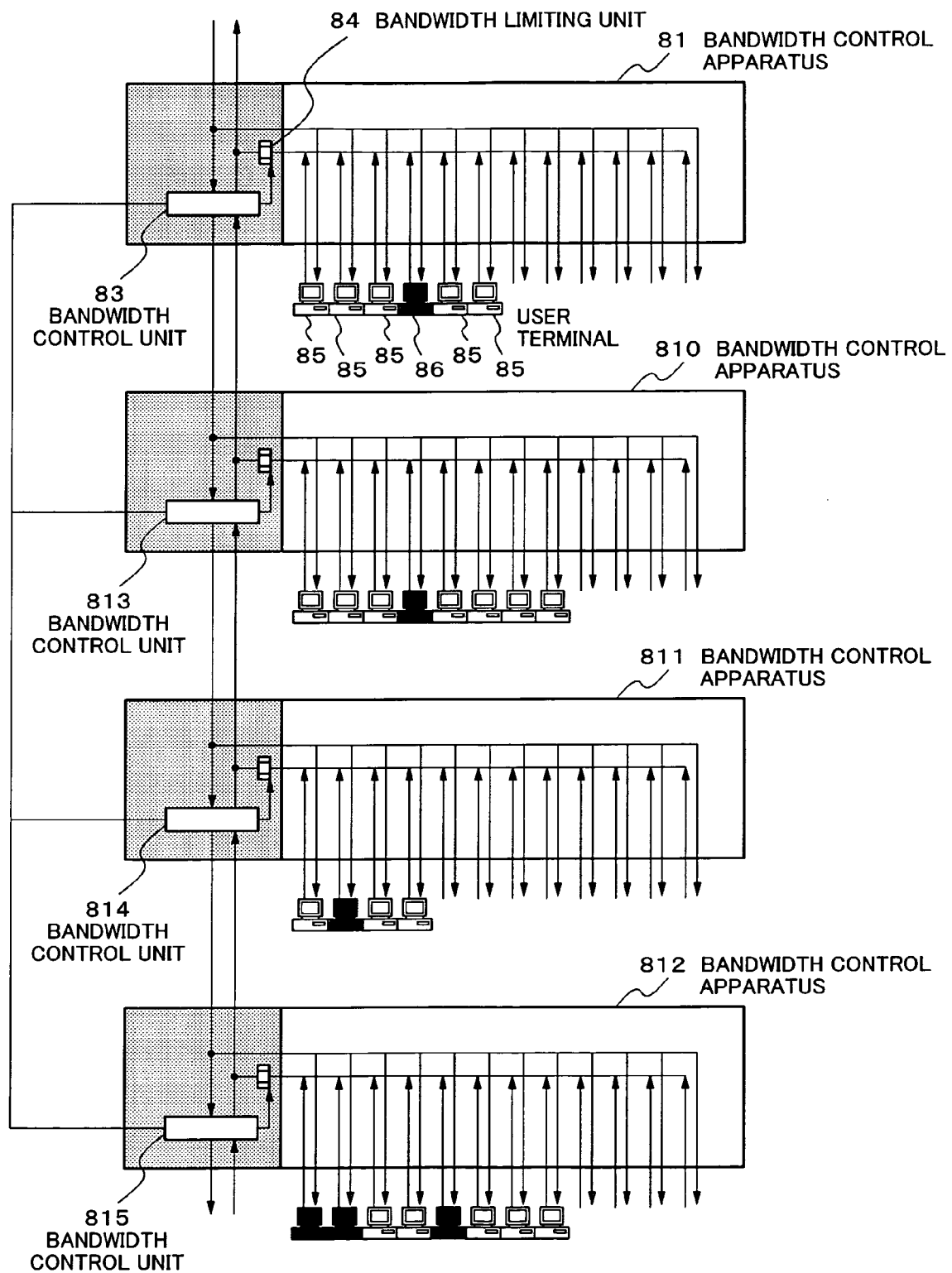
FIG. 8 is a first diagram showing a series of processing operations in a bandwidth control system according to a second exemplary aspect of the present invention.

A series of processing operation in the bandwidth control system according to the second exemplary aspect will be explained with reference to FIG. 8. In FIG. 8, as in the first exemplary aspect, states of upstream access lines are shown in a form of symbols indicating user terminals.

A symbol denoted by reference numeral 85 indicates a user terminal for which the upstream access line is in an active state. A symbol denoted by reference numeral 86 indicates a user terminal for which the upstream access line is in a line disconnection state. An access line without a symbol indicating a user terminal indicates that no user terminal is connected to the access line and the access line is not operated.

As shown in FIG. 8, the numbers of user terminals connected to four bandwidth control apparatuses 81, 810, 811, and 812 are six, eight, four, and eight, respectively. Among the user terminals, the numbers of user terminals for which access lines are in the active state are five, seven, three, and five, respectively. The numbers of user terminals for which access lines are in the line disconnection state are one, one, one, and three, respectively.

A maximum number of user terminals (a maximum number of lines accommodated in the user terminals) can be connected to each of the bandwidth control apparatuses 81, 810, 811, and 812 are twelve.

Figure 10:
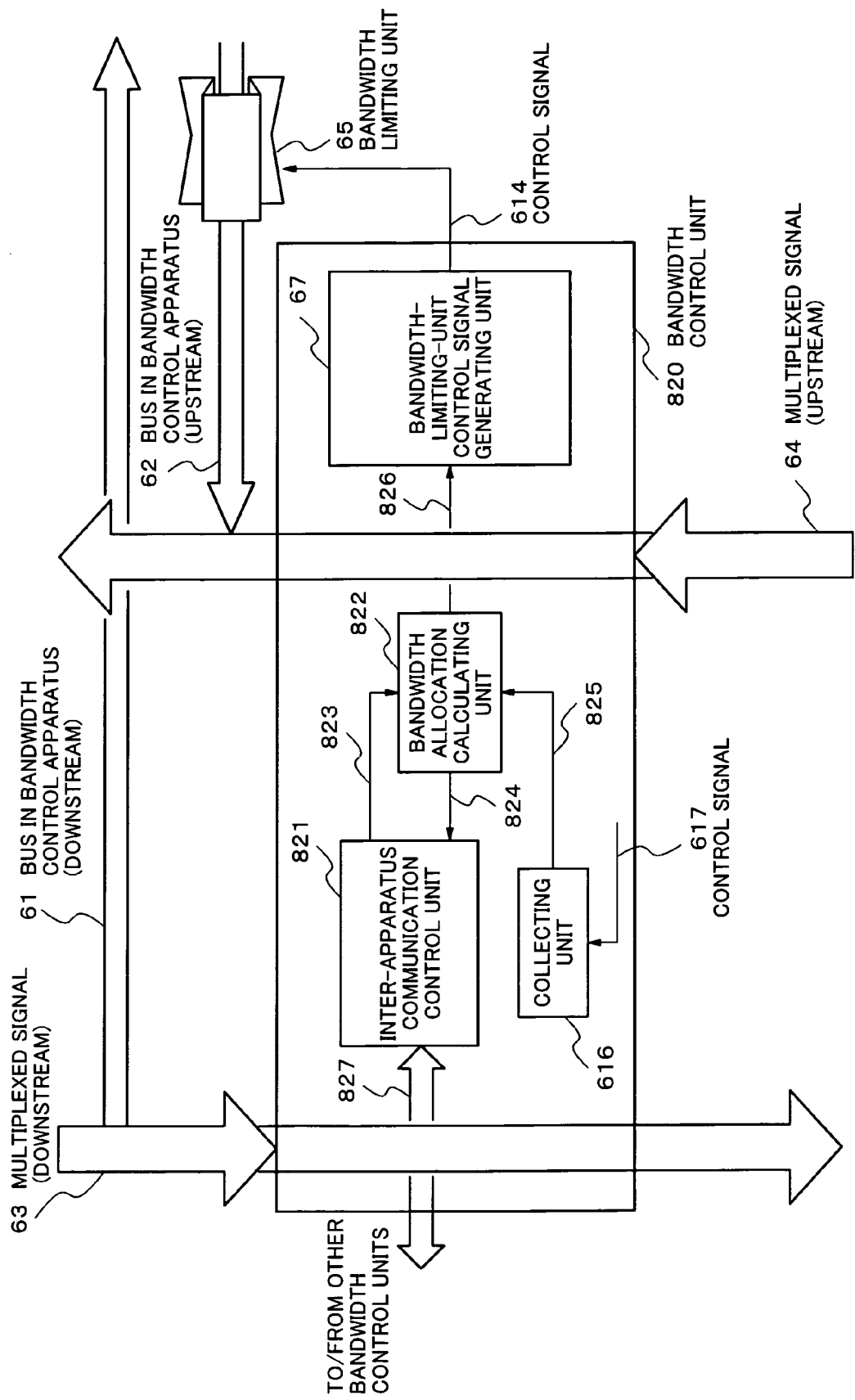
FIG. 10 is a diagram showing an internal structure of a bandwidth control unit of a controlling side apparatus according to the second exemplary aspect.
Figure 11:
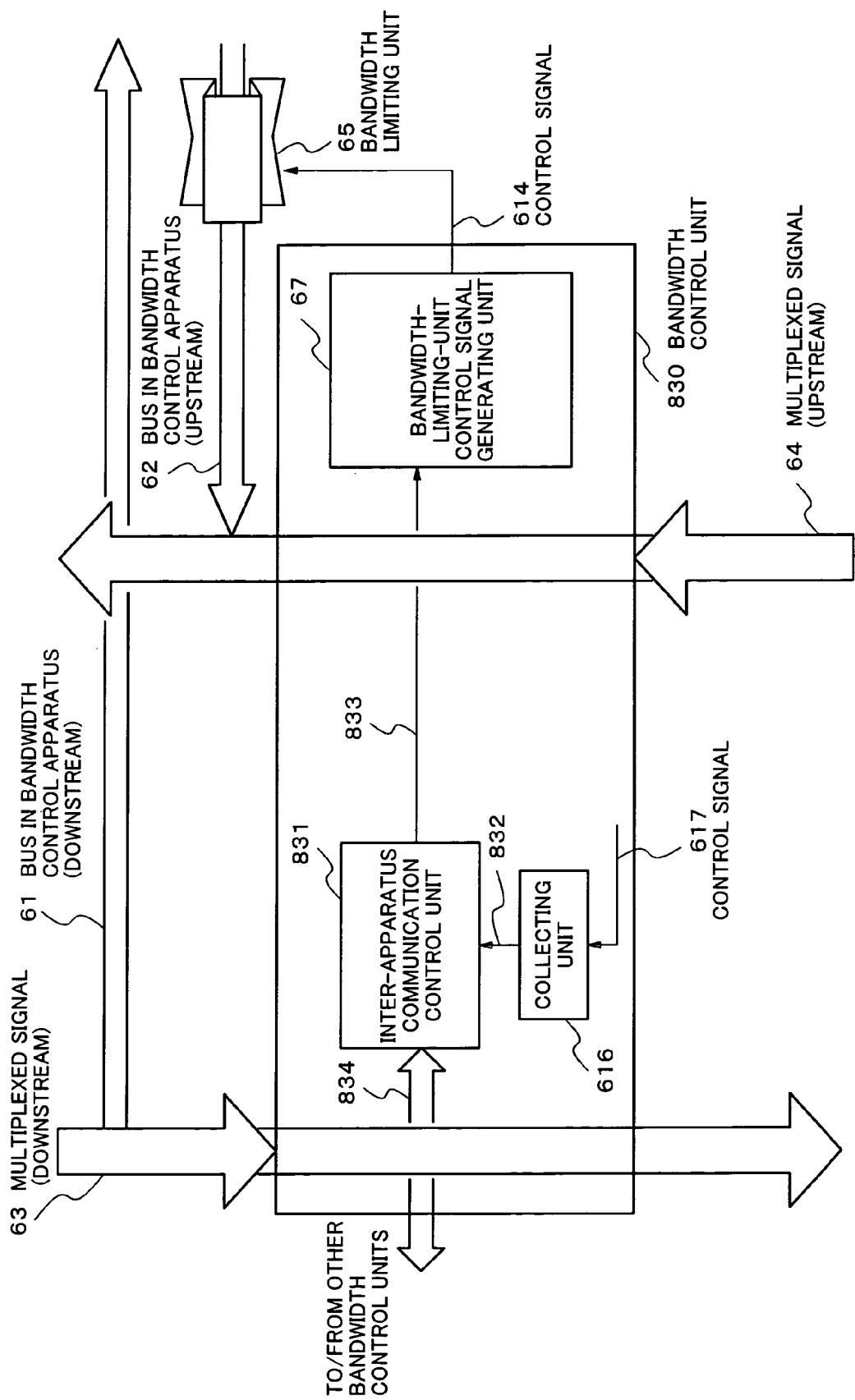
FIG. 11 is a diagram showing an internal structure of a bandwidth control unit of a controlled side apparatus according to the second exemplary aspect.

A constitution of the bandwidth control system according to this exemplary aspect shown in FIG. 8 is different from the constitution of the bandwidth control system according to the first exemplary aspect in that bandwidth control units 83, 813, 814 and 815 provided in the respective bandwidth control apparatuses 81, 810, 811, and 812 are connected to one another by control lines. An internal structure of the bandwidth control unit 83 serving as a controlling side device is shown in FIG. 10. An internal structure of the bandwidth control units 813, 814, and 815 serving as controlled side devices is shown in FIG. 11.

The internal structures of the bandwidth control units of the bandwidth control apparatuses according to this exemplary aspect will be explained with reference to FIGS. 10 and 11. A control operation of the bandwidth control unit 83 of the bandwidth control apparatus 81 at the time of a line state shown in FIG. 8 will be explained.

The internal structure of the bandwidth control unit shown in FIG. 10 is an internal structure of the bandwidth control unit 83 provided in the bandwidth control apparatus 81 on the controlling side in FIG. 8. Reference numeral 820 denotes a bandwidth control unit in FIG. 10. The internal structure of the bandwidth control unit shown in FIG. 11 is an internal structure of the bandwidth control units 813, 814, and 815 provided in the respective bandwidth control apparatuses 810, 811, and 812 on the controlled side in FIG. 8. In FIG. 11, reference numeral 830 denotes a bandwidth control unit. The respective bandwidth control units are connected to one another by a control line denoted by reference numeral 827 in FIG. 10 and reference numeral 834 in FIG. 11 to exchange control packets and perform information transmission. Since the multiplexed signals 63 and 64 and the buses in bandwidth control apparatus 61 and 62 are only transmission paths for data in this exemplary aspect, explanations thereof are omitted. Reference numeral 67 denotes a bandwidth-limiting-unit control signal generating unit, which controls the bandwidth limiting unit 65 using the control signal 614 in the same manner as the bandwidth-limiting-unit control signal generating unit shown in FIG. 7. Reference numeral 616 denotes a collecting unit, which collects bandwidth states of respective access lines in the bandwidth control apparatus using the control signal 617 in the same manner as the collecting unit shown in FIG. 7.

In FIG. 10, reference numeral 821 denotes an inter-apparatus communication control unit. The inter-apparatus communication control unit 821 communicates with the respective bandwidth control unit on the controlled side connected to one another via the control line, collects information on line states of the access lines from the respective bandwidth control units together with identification information, and transmits information on bandwidths, which are allocated to the respective bandwidth control apparatuses, determined. Reference numeral 822 denotes a bandwidth allocation calculating unit. The bandwidth allocation calculating unit 822 calculates, on the basis of information on line states of access lines of the bandwidth control apparatus and the other bandwidth control apparatuses, bandwidths allocated to the respective bandwidth control apparatuses and outputs a result of the calculation. In FIG. 11, reference numeral 831 denotes an inter-apparatus communication control unit. The inter-apparatus communication control unit 831 communicates with the bandwidth control unit on the controlling side via the control line, outputs information on line states of the access lines together with identification information of the bandwidth control apparatus, and receives the information on bandwidths, which are allocated to the bandwidth control apparatus, determined by the bandwidth control unit on the controlling side.

In the bandwidth control unit 820, the collecting unit 616 collects line states of the respective access lines accommodated in the bandwidth control apparatus 81 using the control signal 617 in the apparatus. The control unit 820 accumulates the number of access lines in the active state.

In the bandwidth control unit 820, the inter-apparatus communication control unit 821 receives a control packet via the control line 827 connected to the other bandwidth control apparatuses 810, 811, and 812 constituting the bandwidth control system according to this exemplary aspect. The bandwidth control unit 820 acquires the numbers of active lines of the bandwidth control apparatuses 810, 811, and 812 on the controlled side together with identification information for identifying the respective bandwidth control apparatuses. This identification information is necessary for managing the numbers of active lines acquired from the respective bandwidth control apparatuses in association with the bandwidth control apparatuses.

For example, in FIG. 8, the bandwidth control apparatus 81 accumulates the number of active lines "5" of own apparatus. The bandwidth control unit 83 acquires the number of active lines "7" from the bandwidth control apparatus 810, acquires the number of active lines "3" from the bandwidth control apparatus 811, and acquires the number of active lines "5" from the bandwidth control apparatus 812.

An acquisition method with which the bandwidth control unit 83 acquires the number of active lines from the other bandwidth control apparatuses 810, 811, and 812 is not specifically limited. It is possible to apply any acquisition method. For example, the bandwidth control unit 83 transmits an acquisition request for the number of active lines to the bandwidth control apparatuses 810, 811, and 812 on the controlled side. The bandwidth control apparatuses 810, 811, and 812 on the controlled side respond to the acquisition request to notify the number of active lines. The respective bandwidth control apparatuses 810, 811, and 812 on the controlled side may voluntarily notify the bandwidth control apparatus 81 on the controlling side of the number of active lines when the active state of the access lines accommodated in the bandwidth control apparatus changes. In both the cases, in the bandwidth control unit 830 on the controlled side in FIG. 11, the collecting unit 616 collects line states of the respective access lines accommodated in the bandwidth control apparatus using the control signal 617 in the apparatus. The inter-apparatus communication control unit 831 transmits the number of access lines in the active state accumulated in the bandwidth control unit on the controlling side using a control packet via the control line 834 together with identification information of the bandwidth control apparatus.

The bandwidth control unit 820 in FIG. 10 inputs the number of active lines "5" of the bandwidth control apparatus 81 to the bandwidth allocation calculating unit 822 using the control signal 825. The bandwidth control unit 820 inputs the numbers of active lines "7", "3", and "5" of the bandwidth control apparatuses 810, 811, and 812 on the controlled side to the bandwidth allocation calculating unit 822 using the control signal 823. The bandwidth allocation calculating unit 822 calculates the numbers of active lines of all the bandwidth control apparatuses constituting the bandwidth control system on the basis of the information input. This makes it possible to calculate the number of all the active lines "5+7+3+5=20" in the system shown in FIG. 8 and a ratio of the number of active lines occupied by the respective bandwidth control apparatuses 81, 810, 811, and 812 in the system.

For example, in the case of the system constitution shown in FIG. 8, a ratio of the number of active lines occupied by the bandwidth control apparatus 81 is "5/20", a ratio of the number of active lines occupied by the bandwidth control apparatus 810 is "7/20", a ratio of the number of active lines occupied by the bandwidth control apparatus 811 is "3/20", and a ratio of the number of active lines occupied by the bandwidth control apparatus 812 is "5/20".

In the bandwidth control unit 820 in FIG. 10, the bandwidth allocation calculating unit 822 performs, on the basis of the ratios of the number of active lines occupied by the respective bandwidth control apparatuses 81, 810, 811, and 812, calculation for allocating a bandwidth of a network side interface in the upstream direction in the respective bandwidth control apparatuses 81, 810, 811, and 812.

For example, when assuming the bandwidth allowed in the upstream direction of the network side interface of the system is 100 Mbps, since the number of all active lines in the bandwidth control system is 20 (5+7+3+5), 25 Mbps (100 Mbps×5/20) is allocated to the bandwidth control apparatus 81, 35 Mbps (100 Mbps×7/20) is allocated to the bandwidth control apparatus 810, 15 Mbps (100 Mbps×3/20) is allocated to the bandwidth control apparatus 811, and 25 Mbps (100 Mbps×5/20) is allocated to the bandwidth control apparatus 812. The bandwidth allocation calculating unit 822 outputs the calculation results by a control signal 824 to the inter-apparatus communication control unit 821.

The bandwidth control unit 820 in FIG. 10 notifies the respective bandwidth control apparatuses 810, 811, and 812 on the controlled side of a result of the allocation via the control line 827 by the control packet. The bandwidth control unit 820 notifies the bandwidth-limiting-unit control signal generating unit 67 in the own bandwidth control apparatus 81 of the result from the bandwidth allocation calculating unit 822 by a control signal 826.

In FIG. 11, the bandwidth control apparatus 830 on the controlled side, which has received the result of the allocation, notifies the band-limiting-unit control signal generating unit 67 of bandwidth allocation information of the own bandwidth control apparatus identified by the inter-apparatus communication control unit 831 using a control signal 833.

The bandwidth-limiting-unit control signal generating unit 67, which has received the bandwidth allocation information, controls the bandwidth limiting unit 65 using the control signal 614 to transmit data of an appropriate volume from an upstream access line in accordance with a bandwidth allocated.

Consequently, the respective bandwidth control apparatuses 81, 810, 811, and 812 perform control to equally allocate bandwidths to access lines in the active state. As a result, a bandwidth of 5 Mbps is allocated to the respective access lines in the active state.

Therefore, in this example of bandwidth control, a bandwidth is limited to 5 Mbps for an access line with an effective rate exceeding 5 Mbps. The example described above is based on two values indicating active or disconnected as a state of an access line.

In general, when the number of accommodated lines of bandwidth control apparatuses are n (n is an integer) and the number of the bandwidth control apparatuses is m (m is an integer), ([log(n×(m−1))]+1) bits are necessary in order to notify the number of active lines among the bandwidth control apparatuses. [ ] is a Gaussian symbol and a base of the logarithm is 2. When (n×(m−1)) is a power of 2, '+1' after the Gaussian symbol is unnecessary. In the example of a constitution shown in FIG. 8, ([log(12×(4−1))]+1)=6 bits are necessary.

Figure 9:
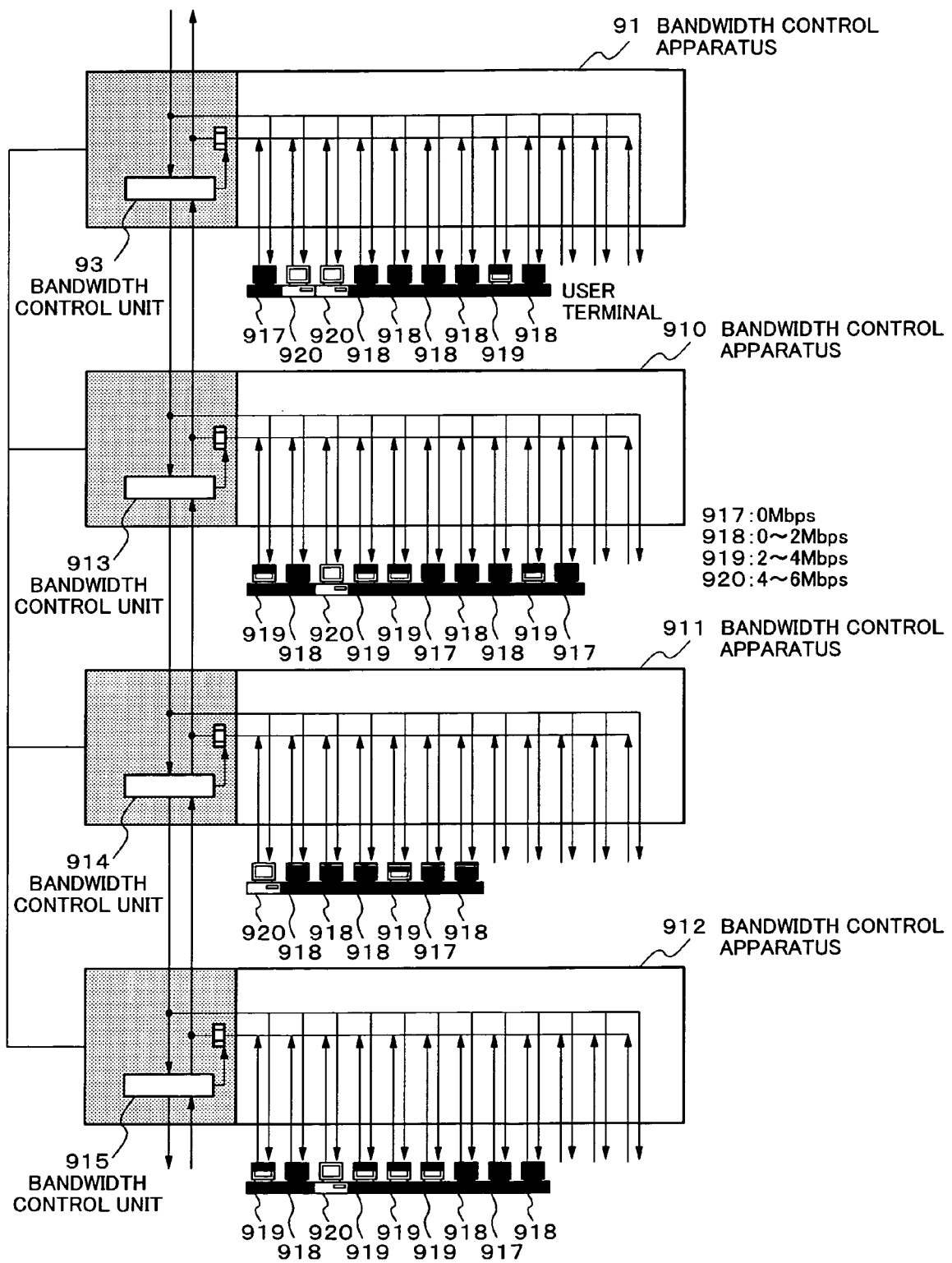
FIG. 9 is a second diagram showing a series of processing operations in the bandwidth control system according to the second exemplary aspect.

Fine adjustment performed according to effective rates will be explained with reference to FIG. 9. In FIG. 9, states of upstream access lines are shown in a form of symbols indicating user terminals.

Effective rates of upstream access lines are classified into four, namely, 0 Mbps (line disconnection), 0 Mbps to 2 Mbps, 2 Mbps to 4 Mbps, and 4 Mbps to 6 Mbps. A symbol indicating a user terminal 917 indicates an access line in a state of the effective rate 0 Mbps (line disconnection). A symbol indicating a user terminal 918 indicates an access line in a state of the effective rate 0 Mbps to 2 Mbps. A symbol indicating a user terminal 919 indicates an access line in a state of the effective rate 2 Mbps to 4 Mbps. A symbol indicating a user terminal 920 indicates an access line of a state of the effective rate 4 Mbps to 6 Mbps. An access line to which a user terminal is not connected indicates that the line is not operated.

A control operation in a bandwidth control unit 93 of a bandwidth control apparatus 91 at the time of a line state shown in FIG. 9 will be explained. Operations of the bandwidth control unit 93 of a control side apparatus and bandwidth control units 913, 914, and 915 of controlled side apparatuses are similar to the operations of the bandwidth control units 820 and 830 explained using FIGS. 10 and 11. Thus, further detailed explanations of the control operations are omitted. The control operations are different only in that, whereas information to be controlled is the "number of access lines in the active state" in the example described above, information to be controlled is "effective rates of access lines in the active state" in this example.

First, the bandwidth control units 93, 913, 914, and 915 of the respective bandwidth control apparatuses 91, 910, 911, and 912 collect line states in the bandwidth control apparatuses 91, 910, 911, and 912 using control signals in the apparatuses, respectively, and classify and accumulate effective rates of access lines in the active state. In this case, the effective rates 0 Mbps (line disconnection), 0 Mbps to 2 Mbps, 2 Mbps to 4 Mbps, and 4 Mbps to 6 Mbps are calculated as "0", "1", "2", and "3", respectively.

For example, in the bandwidth control apparatus 910 shown in FIG. 9, there are two lines with the effective rate 0 Mbps (line disconnection) (917), three lines with the effective rate 0 Mbps to 2 Mbps (918), four lines with the effective rate 2 Mbps to 4 Mbps (919), and one line with the effective rate 4 Mbps to 6 Mbps (920). Thus, an accumulated value is "0×2"+"1×3"+"2×4"+"3×1"="14".

The bandwidth control unit 93 receives control packets from the other bandwidth control apparatuses 910, 911, and 912 constituting the bandwidth control system in this exemplary aspect via control lines connected to one another. The bandwidth control unit 93 acquires an accumulated value of effective rates in all the bandwidth control apparatuses 91, 910, 911, and 912 constituting this system.

For example, the bandwidth control unit 93 acquires an effective rate "13" from the own bandwidth control apparatus 91, acquires an effective rate "14" from the bandwidth control apparatus 910, acquires an effective rate "9" from the bandwidth control apparatus 911, and acquires an effective rate "14" from the bandwidth control apparatus 912. When the bandwidth control unit 93 acquires the effective rates, the bandwidth control unit 93 also acquires identification information for identifying the respective bandwidth control apparatus.

The bandwidth control unit 93 adds the accumulated value "13" of the effective rate of the own bandwidth control apparatus 91 and the accumulated values "14", "9", and "14" of the effective rates of the other bandwidth control apparatuses 910, 911, and 912 and calculates a total value of effective rates of all the bandwidth control apparatuses constituting the bandwidth control system. This makes it possible to calculate a total value of all the effective rates "13+14+9+14=50" in the system shown in FIG. 9 and a ratio of the effective rates occupied by the respective bandwidth control apparatuses 91, 910, 911, and 912 in the system.

For example, in the case of the system constitution shown in FIG. 9, a ratio of the effective rates occupied by the bandwidth control apparatus 91 is "13/50", a ratio of the effective rates occupied by the bandwidth control apparatus 910 is "14/50", a ratio of the effective rates occupied by the bandwidth control apparatus 911 is "9/50", and a ratio of the effective rates occupied by the bandwidth control apparatus 912 is "14/50".

The effective rates are not total values themselves of the effective rates of the respective bandwidth control apparatuses 91, 910, 911, and 912 but are, as described above, weighted total values obtained by classifying the effective rates into three stages (the effective rate zero, that is, line disconnection is not included in the stages) and giving numerical values 1 to 3 to the effective rates according to the stages classified.

The bandwidth control unit 93 allocates a bit rate of the network side interface in the upstream direction in the respective bandwidth control apparatuses 91, 910, 911, and 912 on the basis of the ratios of the effective rates occupied by the respective bandwidth control apparatuses calculated above.

For example, in the constitution shown in FIG. 9, a total of the effective rates of all access lines in the system is "50". When assuming the bit rate of the network side interface in the upstream direction is 100 Mbps, 26 Mbps (100 Mbps×13/50) is allocated to the bandwidth control apparatus 91, 28 Mbps (100 Mbps×14/50) is allocated to the bandwidth control apparatus 910, 18 Mbps (100 Mbps×9/50) is allocated to the bandwidth control apparatus 911, and 28 Mbps (100 Mbps×14/50) is allocated to the bandwidth control apparatus 912.

The bandwidth control unit 93 notifies the respective bandwidth control apparatuses 910, 911, and 912 of a result of the allocation and performs control to transmit data of an appropriate volume from the respective bandwidth control apparatuses 91, 910, 911, and 912. When the bandwidth control unit 93 notifies the respective bandwidth control apparatuses 910, 911, and 912 of the result of the allocation, the bandwidth control unit 93 notifies the result of the allocation on the basis of the identification information acquired from the respective bandwidth control apparatuses 910, 911, and 912.

The respective bandwidth control apparatuses 91, 910, 911, and 912 allocate bandwidths to access lines in the active state to proportionally distribute the bandwidths according to effective rates of the respective access lines. As a result, a bandwidth of 0 Mbps is allocated to access lines with the effective rate 0 Mbps (line disconnection), a bandwidth of 2 Mbps is allocated to access lines of the effective rate 0 Mbps to 2 Mbps, a bandwidth of 4 Mbps is allocated to access lines with the effective rate 2 Mbps to 4 Mbps, and a bandwidth of 6 Mbps is allocated to access lines with the effective rate 4 Mbps to 6 Mbps.

Therefore, in this example of bandwidth control, even in an access line with an effective rate exceeding 6 Mbps, a bandwidth is limited to 6 Mbps.

In the method described above, the effective rates of the access lines are classified into three stages and the classified stages are weighted to distribute bandwidths. In general, when effective rates of respective lines are classified into p stages (p is an integer), the number of accommodated lines of bandwidth control apparatuses is set to n (n is an integer), and the number of bandwidth control apparatuses is set to m (m is an integer), ([log(p×n×(m−1))]+1) bits are necessary in order to notify the number of active lines among the bandwidth control apparatuses. [ ] is a Gaussian symbol and a base of the logarithm is 2.

When (p×n×(m−1)) is a power of 2, '+1' after the Gaussian symbol is unnecessary. In the example in FIG. 9, ([log(3×12×(4−1))]+1)=7 bits are necessary.

In this way, the bandwidth control system according to the second exemplary aspect is capable of controlling bandwidth distribution faithfully and on a real time basis according to operation states of respective access lines and effective rates of the respective access lines using a bandwidth control apparatus having a simple constitution. Therefore, compared with static setting control, it is possible to accurately realize fairness among the access lines and effectively utilize all bandwidths of a multiplexed signal without waste.

(Third Exemplary Aspect)

A third exemplary aspect of the invention will be explained.

Figure 12:
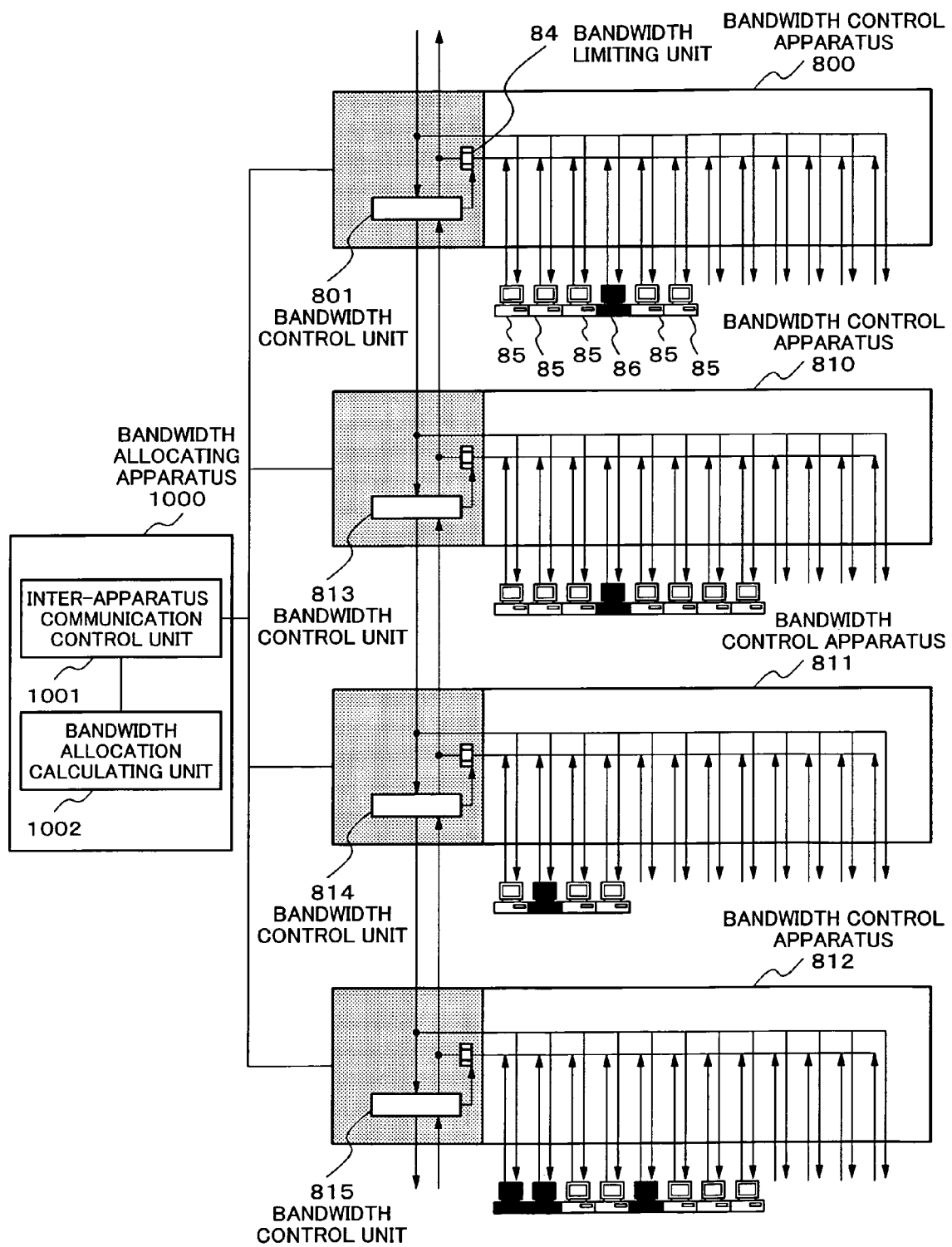
FIG. 12 is a diagram showing a series of processing operations in a bandwidth control system according to a third exemplary aspect of the present invention.

As shown in FIG. 8, the bandwidth control system according to the second exemplary aspect sets bandwidths allocated to the respective bandwidth control apparatuses 81, 810, 811, and 812 in one bandwidth control apparatus 81 constituting the system. However, as shown in FIG. 12, a bandwidth control system according to the third exemplary aspect is characterized in that a bandwidth allocating apparatus 1000 for controlling and setting bandwidths to be allocated to respective bandwidth control apparatuses 800, 810, 811, and 812 is separately provided.

In the bandwidth control system according to this exemplary aspect, the bandwidth allocating apparatus 1000 is connected to the respective bandwidth control apparatuses 800, 810, 811, and 812 via control lines. The bandwidth allocating apparatus 1000 performs the allocation control performed in the bandwidth control apparatus 81 shown in FIG. 8 and the bandwidth control apparatus 91 shown in FIG. 9. Therefore, all the bandwidth control units 801, 813, 814, and 815 provided in the respective bandwidth control apparatuses 800, 810, 811, and 812 are bandwidth control units of controlled side apparatuses and have the same internal constitution as the bandwidth control apparatus 830 shown in FIG. 11.

The bandwidth allocating apparatus 1000 includes an inter-apparatus communication control unit 1001 that performs information transmission between the bandwidth allocating unit 1000 and the respective bandwidth control units 801, 813, 814, and 815, and a bandwidth allocation calculating unit 1002 that acquires bandwidth states of access lines in the respective bandwidth control apparatuses 800, 810, 811 and 812 and calculates bandwidths to be allocated to the respective bandwidth control apparatuses. The inter-apparatus communication control unit 1001 and the bandwidth allocation calculating unit 1002 perform operations similar to the operations of the inter-apparatus communication control units 821 and 831 and the bandwidth allocation calculating unit 822 in FIGS. 10 and 11 explained in the second exemplary aspect.

An acquisition method with which the bandwidth allocating apparatus 1000 acquires bandwidth states of access lines from the respective bandwidth control apparatuses 800, 810, 811, and 812 is not specifically limited. As in the second exemplary aspect, it is possible to apply any acquisition method.

The inter-apparatus communication control unit 1001 of the bandwidth allocating apparatus 1000 acquires the number of access lines in the active state or effective rates of the access lines from the respective bandwidth control apparatuses 800, 810, 811, and 812 via control lines together with identification information for identifying the respective bandwidth control apparatuses 800, 810, 811, and 812. As in the second exemplary aspect, the bandwidth allocation calculating unit 1002 allocates a multiplexed signal bandwidth of the network side interface in the upstream direction in the respective bandwidth control apparatuses 800, 810, 811, and 812 on the basis of the number of active lines or the effective rates acquired. The inter-apparatus communication control unit 1001 notifies the respective bandwidth control apparatuses 800, 810, 811, and 812 of a result of the allocation via the control line on the basis of the identification information of the bandwidth control apparatuses.

The respective bandwidth control apparatuses 800, 810, 811, and 812, which have received the result of the allocation of the bandwidths, control bandwidth limiting units 84 of the bandwidth control apparatuses to control bandwidths of the respective access lines so as to transmit data of an appropriate volume from the respective bandwidth control apparatuses 800, 810, 811, and 812.

The exemplary aspects described above are preferable ones and do not limit a scope of the invention to the exemplary aspects only. It is possible to carry out the invention in various modified forms without departing from the spirit of the invention.

For example, it is also possible to execute the processing operation in the bandwidth control apparatus and the bandwidth allocating apparatus according to the exemplary aspects with a hardware configuration or a combination of a hardware and software configuration. It is also possible to cause an information processing apparatus to execute the processing operation by recording the program in a recording medium such as an optical recording medium, a magnetic recording medium, a magneto-optical recording medium, or semiconductor and causing the information processing apparatus to read the program from the recording medium. It is also possible to cause the information processing apparatus to execute the processing operation by causing the information processing apparatus to read a program from an external device connected to the information processing apparatus via a predetermined network.

The packet switching system is applied to the bandwidth control system according to the exemplary aspects. The bandwidth control system notifies operation states of access lines and effective rates of the access lines using a control packet. However, it is also possible to apply the circuit switching system to the bandwidth control system and constitute the bandwidth control system to notify operation states of access lines and effective rates of the access lines using a main signal overhead and perform the bandwidth control in the exemplary aspects.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. A bandwidth control apparatus that is connected with a plurality of other bandwidth control apparatuses in cascade through an upstream multiplexed signal line and a downstream multiplexed signal line, accommodates a plurality of access lines to which user terminals are connected and controls transmission bandwidths of the access lines, the bandwidth control apparatus comprising:

a concentration unit that multiplexes upstream signals input from the plurality of access lines accommodated in the bandwidth control apparatus and upstream signals input from the other bandwidth control apparatuses located in a downstream direction and outputs the multiplexed signal as an upstream multiplexed signal, and branches a downstream multiplexed signal for broadcasting to the plurality of access lines accommodated in the bandwidth control apparatus as downstream signals and providing to the other bandwidth control apparatuses located in the downstream direction as the downstream signals;

a first bandwidth state acquiring unit that collects bandwidth states of the plurality of access lines accommodated in the bandwidth control apparatus and acquires a bandwidth state in the bandwidth control apparatus;

a second bandwidth state acquiring unit that acquires bandwidth states in the other bandwidth control apparatuses that are connected to one another in cascade;

a bandwidth state allocating unit that calculates, a total bandwidth state of the bandwidth state acquired by the first bandwidth state acquiring unit and the bandwidth states acquired by the second bandwidth state acquiring unit, and allocates a transmission bandwidth to be controlled in the bandwidth control apparatus based on a ratio of the bandwidth state acquired by the first bandwidth state acquiring unit and the total bandwidth state; and a bandwidth state control unit that controls transmission bandwidths of the plurality of access lines accommodated in the bandwidth control apparatus on the basis of the transmission bandwidth allocated by the bandwidth state allocating unit.

2. The bandwidth control apparatus according to claim 1, wherein the second bandwidth state acquiring unit acquires each of bandwidth states of the other bandwidth control apparatuses together with identification information for identifying the respective bandwidth control apparatuses, the bandwidth state allocating unit allocates a transmission bandwidth to be controlled in the bandwidth control apparatus based on a ratio of the bandwidth state acquired by the first bandwidth state acquiring unit and the total bandwidth state, and each of transmission bandwidths to be controlled in the other bandwidth control apparatuses, based on a ratio of each of the bandwidth states of the other bandwidth control apparatuses acquired by the second bandwidth state acquiring unit and the total bandwidth state, and the bandwidth control apparatus further includes a bandwidth information communicating unit that notifies each of the transmission bandwidths allocated by the bandwidth state allocating unit to the other bandwidth control apparatuses according to the identification information.

3. The bandwidth control apparatus according to claim 1, wherein the other bandwidth control apparatuses include a first adjacent bandwidth control apparatus connected to an upstream side of the bandwidth control apparatus and a second adjacent bandwidth control apparatus connected to a downstream side of the bandwidth control apparatus, the second bandwidth state acquiring unit includes:

an upstream side bandwidth state acquiring unit that acquires a bandwidth state on the upstream side notified from the first adjacent bandwidth control apparatus through the down stream multiplexed signal line; and a downstream side bandwidth state acquiring unit that acquires a bandwidth state on the downstream side notified from the second adjacent bandwidth control apparatus through the upstream multiplexed signal line, and the bandwidth control apparatus further includes a bandwidth state providing unit that notifies, through the downstream multiplexed signal line, the second adjacent bandwidth control apparatus of a total bandwidth state of the bandwidth state in the bandwidth control apparatus acquired by the first bandwidth state acquiring unit and the bandwidth state on the upstream side acquired by the upstream side bandwidth state acquiring unit, and notifies, through the upstream multiplexed signal line, the first adjacent bandwidth control apparatus of another total bandwidth state of the bandwidth state in the bandwidth control apparatus acquired by the first bandwidth state acquiring unit and the bandwidth state on the downstream side acquired by the downstream side bandwidth state acquiring unit.

4. The bandwidth control apparatus according to claim 3, wherein the bandwidth states acquired by the first bandwidth state acquiring unit and the second bandwidth state acquiring unit are numbers of access lines in an active state, and the bandwidth state allocating unit calculates, a first total number of access lines in the active state in the bandwidth control apparatus, and a second total number of access lines in the active state in the bandwidth control apparatus and the other bandwidth control apparatuses, and allocates a transmission bandwidth to be controlled in the bandwidth control apparatus based on a ratio of the first total number and the second total number.

5. The bandwidth control apparatus according to claim 2, wherein the bandwidth states acquired by the first bandwidth state acquiring unit and the second bandwidth state acquiring unit are numbers of access lines in an active state, and the bandwidth state allocating unit calculates, a first total number of access lines in the active state in the bandwidth control apparatus, a second total number of access lines in the active state in the other bandwidth control apparatuses and a third total number of access lines in the active state in the bandwidth control apparatus and the other bandwidth control apparatuses, and allocates a transmission bandwidth to be controlled in the bandwidth control apparatus, based on a ratio of the first total number and the third total number and each of transmission bandwidths to be controlled in the other bandwidth control apparatuses based on a ratio of the second total number and the third total number.

6. The bandwidth control apparatus according to claim 3, wherein the bandwidth states acquired by the first bandwidth state acquiring unit and the second bandwidth state acquiring unit are numerical values weighted according to effective rates of access lines in an active state, and the bandwidth state allocating unit calculates a first total numerical value weighted according to effective rates of access lines in the active state in the bandwidth control apparatus and a second total numerical value weighted according to effective rates of access lines in the active state in the bandwidth control apparatus and the other bandwidth control apparatuses, and allocates a transmission bandwidth to be controlled in the bandwidth control apparatus based on a ratio of the first total numerical value and the second total numerical value.

7. The bandwidth control apparatus according to claim 2, wherein
the bandwidth states acquired by the first bandwidth state acquiring unit and the second bandwidth state acquiring unit are numerical values weighted according to effective rates of access lines in an active state, and
the bandwidth state allocating unit calculates, a first total numerical value weighted according to effective rates of access lines in the active state in the bandwidth control apparatus, a second total numerical value weighted according to effective rates of access lines in the active state in the other bandwidth control apparatuses, and a third total numerical value weighted according to effective rates of access lines in the active state in the bandwidth control apparatus and the other bandwidth control apparatuses, and allocates a transmission bandwidth to be controlled in the bandwidth control apparatus based on a ratio of the first total numerical value and the third total numerical value, and the transmission bandwidths to be controlled in the other bandwidth control apparatuses based on a ratio of the second total numerical value and the third total numerical value.

8. A bandwidth control system including a plurality of bandwidth control apparatuses, each of the bandwidth control apparatuses is connected with other bandwidth control apparatuses in cascade through an upstream multiplexed signal line and a downstream multiplexed signal line, accommodates a plurality of access lines to which user terminals are connected, acquires a total bandwidth state of the plurality of access lines and controls transmission bandwidths of the access lines, the bandwidth control system comprising:
a first bandwidth control apparatus that is located at the most upstream side of the cascade connection, notifies a bandwidth control apparatuses connected to a downstream side of a first total bandwidth state of the first bandwidth control apparatus through the downstream multiplexed signal line, calculates a total system bandwidth state by adding the first total bandwidth state to the bandwidth states of other bandwidth control apparatuses acquired through the upstream multiplexed signal line and allocates a transmission bandwidth to be controlled in the first bandwidth control apparatus based on a ratio of the first total bandwidth state and the total system bandwidth state;
a second bandwidth control apparatus that is located at the most downstream side of the cascade connection, notifies a bandwidth control apparatus connected to an upstream side of a second total bandwidth state of the second bandwidth control apparatus through the upstream multiplexed signal line, calculates a total system bandwidth state by adding the second total bandwidth state to the bandwidth states of other bandwidth control apparatuses acquired through the downstream multiplexed signal line and allocates a transmission bandwidth to be controlled in the second bandwidth control apparatus based on a ratio of the second total bandwidth state and the total system bandwidth state, and
a third bandwidth control apparatus that is located between the first bandwidth control apparatus and the second bandwidth control apparatus of the cascade connection, notifies the bandwidth control apparatus connected to the upstream side of a downstream total bandwidth state, in which a third total bandwidth state of the third bandwidth control apparatus and a fourth total bandwidth state of the bandwidth states of other bandwidth control apparatuses located at the downstream side notified through the upstream multiplexed signal line are added, through the upstream multiplexed signal line, notifies the bandwidth control apparatus connected to the downstream side of an upstream total bandwidth state, in which the third total bandwidth state of the third bandwidth control apparatus and a fifth total bandwidth state of the bandwidth states of other bandwidth control apparatuses located at the upstream side notified through the downstream multiplexed signal line are added, through the downstream multiplexed signal line, calculates a total system bandwidth state by summing the third total bandwidth state, the fourth total bandwidth state and the fifth total bandwidth state, and allocates a transmission bandwidth to be controlled in the third bandwidth control apparatus based on a ratio of the third total bandwidth state and the total system bandwidth state.

9. A bandwidth control method for a bandwidth control apparatus that is connected with a plurality of other bandwidth control apparatuses in cascade through an upstream multiplexed signal line and a down stream multiplexed signal line,
accommodates a plurality of access lines to which user terminals are connected, and controls a transmission bandwidth of the access lines, the bandwidth control method comprising:
a first bandwidth state acquiring step for acquiring a bandwidth state of the access lines accommodated in the bandwidth control apparatus;
a second bandwidth state acquiring step for acquiring bandwidth states in the other bandwidth control apparatuses that are connected to one another in cascade;
a bandwidth allocating step for calculating a total bandwidth state of the bandwidth state acquired in the first bandwidth state acquiring step and the bandwidth acquired in the second bandwidth state acquiring step, and allocating a transmission bandwidth to be controlled in the bandwidth control apparatus based on a ratio of the bandwidth state acquired in the first bandwidth state acquiring step and the total bandwidth state; and
a bandwidth control step performed by a bandwidth state control unit for controlling, on the basis of the transmission bandwidth allocated in the bandwidth allocating step, transmission bandwidths of the access lines accommodated in the bandwidth control apparatus,
wherein upstream signals from the access lines accommodated in the bandwidth control apparatus and upstream signals from the other bandwidth control apparatuses located in a downstream direction are multiplexed for outputting an upstream multiplexed signal through the upstream multiplexed signal line, and a downstream multiplexed signal through the downstream multiplexed signal line is branched for broadcasting to the access lines accommodated in the bandwidth control apparatus as downstream signals and providing to the other bandwidth control apparatuses located in the downstream direction as the downstream signals.

10. The bandwidth control method according to claim 9, wherein the other bandwidth control apparatuses include a first adjacent bandwidth control apparatus connected to an upstream side of the bandwidth control apparatus and a second adjacent bandwidth control apparatus connected to a downstream side of the bandwidth control apparatus, wherein the second bandwidth state acquiring step comprises:
an upstream bandwidth state acquiring step for acquiring a bandwidth state on the upstream side notified from the first adjacent bandwidth control apparatus through the down stream multiplexed signal line; and
a downstream bandwidth state acquiring step for acquiring a bandwidth state on the downstream side notified from the second adjacent bandwidth apparatus through the upstream multiplexed signal line; and wherein the method further comprising:

a bandwidth state providing step for notifying, through the downstream multiplexed signal line, the second adjacent bandwidth control apparatus of a total bandwidth state of the bandwidth states acquired in the first bandwidth state acquiring step and the bandwidth states acquired in the upstream bandwidth state acquiring step and notifying, through the upstream multiplexed signal line, the first adjacent bandwidth control apparatus of another total bandwidth state of the bandwidth states acquired in the first bandwidth state acquiring step and the bandwidth state acquired in the downstream bandwidth state acquiring step.

11. A bandwidth allocating apparatus that allocates bandwidths of a plurality of bandwidth control apparatuses, each of the bandwidth control apparatuses is connected with other bandwidth control apparatuses in cascade through an upstream multiplexed signal line and a downstream multiplexed signal line, accommodates a plurality of access lines to which user terminals are connected, and controls transmission bandwidths of the access lines, the bandwidth allocating apparatus comprising:

a bandwidth state acquiring unit that acquires bandwidth states from each of the plurality of bandwidth control apparatuses together with identification information for identifying the bandwidth control apparatuses;

a bandwidth allocating unit that calculates, a total bandwidth state of the bandwidth states acquired by the bandwidth state acquiring unit, and allocates each of transmission bandwidths to be controlled in the respective bandwidth control apparatuses based on a ratio of each of the bandwidth states of the respective bandwidth control apparatuses and the total bandwidth state; and an allocated bandwidth providing unit that provides each of the bandwidth control apparatuses with the bandwidths allocated by the bandwidth allocating unit according to the identification information, and wherein upstream signals from the access lines accommodated in a bandwidth control apparatus and upstream signals from the other bandwidth control apparatuses located in a downstream direction are multiplexed for outputting an upstream multiplexed signal through the upstream multiplexed signal line, and a downstream multiplexed signal through the downstream multiplexed signal line is branched for broadcasting to the access lines accommodated in the bandwidth control apparatus as downstream signals and providing to the other bandwidth control apparatuses located in the downstream direction as the downstream signals.

12. A bandwidth control method for a bandwidth control system including a plurality of bandwidth control apparatuses, each of the bandwidth control apparatuses is connected with other bandwidth control apparatuses in cascade through an upstream multiplexed signal line and a downstream multiplexed signal line, accommodates a plurality of access lines to which user terminals are connected, acquires a total bandwidth state of the plurality of access lines and controls transmission bandwidths of the access lines, the bandwidth control method comprising:

steps performed by a first bandwidth control apparatus that is located at the most upstream side of the cascade connection includes:

a first total bandwidth state notifying step for notifying a bandwidth control apparatus connected to a downstream side of a first total bandwidth state of the first bandwidth control apparatus through the downstream multiplexed signal line;

a total system bandwidth state calculating step for calculating a total system bandwidth state by adding the first total bandwidth state to the bandwidth states of other bandwidth control apparatuses acquired through the upstream multiplexed signal line; and a transmission bandwidth allocating step for allocating a transmission bandwidth to be controlled in the first bandwidth control apparatus based on a ratio of the first total bandwidth state and the total system bandwidth state, steps performed by a second bandwidth control apparatus that is located at the most downstream side of the cascade connection includes:

a second total bandwidth state notifying step for notifying a bandwidth control apparatus connected to an upstream side of a second total bandwidth state of the second bandwidth control apparatus through the upstream multiplexed signal line;

a total system bandwidth state calculating step for calculating a total system bandwidth state by adding the second total bandwidth state to the bandwidth states of other bandwidth control apparatuses acquired through the downstream multiplexed signal line; and a transmission bandwidth allocating step for allocating a transmission bandwidth to be controlled in the second bandwidth control apparatus based on a ratio of the second total bandwidth state and the total system bandwidth state, steps performed by a third bandwidth control apparatus that is located between the first bandwidth control apparatus and the second bandwidth control apparatus of the cascade connection includes:

a downstream total bandwidth state notifying step for notifying the bandwidth control apparatus connected to the upstream side of a downstream total bandwidth state, in which a third total bandwidth state of the third bandwidth control apparatus and a fourth total bandwidth state of the bandwidth states of other bandwidth control apparatuses located at the downstream side notified through the upstream multiplexed signal line are added, through the upstream multiplexed signal line;

an upstream total bandwidth state notifying step for notifying the bandwidth control apparatus connected to the downstream side of an upstream total bandwidth state, in which the third total bandwidth state of the third bandwidth control apparatus and a fifth total bandwidth state of the bandwidth states of other bandwidth control apparatuses located at the upstream side notified through the downstream multiplexed signal line are added, through the downstream multiplexed signal line;

a total system bandwidth state calculating step for calculating a total system bandwidth state by summing the third total bandwidth state, the fourth total bandwidth state and the fifth total bandwidth state; and a transmission bandwidth allocating step for allocating a transmission bandwidth to be controlled in the third bandwidth control apparatus based on a ratio of the third total bandwidth state and the total system bandwidth state.

* * * * *